United States Patent
Smith et al.

(10) Patent No.: US 8,655,938 B1
(45) Date of Patent: Feb. 18, 2014

(54) SOCIAL MEDIA CONTRIBUTOR WEIGHT

(75) Inventors: Kevin G. Smith, Lehi, UT (US); William Brandon George, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 201 days.

(21) Appl. No.: 13/116,300

(22) Filed: May 26, 2011

Related U.S. Application Data

(63) Continuation-in-part of application No. 12/789,715, filed on May 28, 2010.

(60) Provisional application No. 61/346,394, filed on May 19, 2010.

(51) Int. Cl.
  *G06F 15/16* (2006.01)
  *G06F 17/30* (2006.01)
  *G06F 17/00* (2006.01)

(52) U.S. Cl.
  USPC .................. 709/200; 707/999.001; 706/45

(58) Field of Classification Search
  None
  See application file for complete search history.

(56) References Cited

U.S. PATENT DOCUMENTS

| | | | |
|---|---|---|---|
| 7,421,429 B2 | 9/2008 | Thota | |
| 7,444,358 B2 | 10/2008 | Paczkowski et al. | |
| 7,689,624 B2 | 3/2010 | Huang et al. | |
| 8,082,288 B1 * | 12/2011 | Yeh et al. | 709/200 |
| 8,200,775 B2 | 6/2012 | Moore | |
| 2006/0004691 A1 * | 1/2006 | Sifry | 707/1 |
| 2006/0074905 A1 | 4/2006 | Yun et al. | |
| 2007/0214097 A1 | 9/2007 | Parsons et al. | |
| 2007/0265864 A1 | 11/2007 | Chess et al. | |
| 2009/0125511 A1 | 5/2009 | Kumar | |
| 2009/0192896 A1 | 7/2009 | Newton et al. | |
| 2009/0282144 A1 | 11/2009 | Sherrets et al. | |
| 2010/0057548 A1 | 3/2010 | Edwards | |
| 2011/0231296 A1 * | 9/2011 | Gross et al. | 705/37 |
| 2011/0307312 A1 * | 12/2011 | Goeldi | 705/14.6 |

OTHER PUBLICATIONS

Non Final Office Action in Related U.S. Appl. No. 12/789,715, dated Jul. 17, 2012, 20 pages.

* cited by examiner

*Primary Examiner* — Wen-Tai Lin
(74) *Attorney, Agent, or Firm* — Kilpatrick Townsend & Stockton LLP

(57) ABSTRACT

A system and method is disclosed for measuring contributor weight or influence in social media. Content posted by a user on one or more social media platforms is identified. The identifying the content posted by the user includes searching the one or more social media platforms for content posted by the user with identifying information. Downstream content associated with the content posted by the user is identified. Metrics measuring a contributor weight of the user based on the downstream content are calculated.

18 Claims, 13 Drawing Sheets

SOCIAL MEDIA CONTRIBUTOR WEIGHT

BACKGROUND

This application is a continuation-in-part of U.S. patent application Ser. No. 12/789,715, which was filed on May 28, 2010, which claims priority to U.S. Provisional Application Ser. No. 61/346,394, filed May 19, 2010.

Recent years have seen an explosion in the popularity and availability of social media platforms, such as social networking applications, web logs ("blogs"), message boards, interactive news websites, photo-sharing sites, etc. Social media allows users to interact with one another, such as by posting new content and/or by posting reactions to content posted by others. As such, social media platforms provide users with forums in which to engage in conversations with one another.

The wealth of data embodying sentiment and opinion that exists on social media platforms is of great value to companies that wish to understand potential customers, to gauge public sentiment regarding particular brands, to detect social trends, and/or to otherwise understand target customer demographics. Further, wealth of data embodying sentiment and opinion that exists on social media offers the opportunity to influence public sentiment and creates demand for new tools focused on gathering and interpreting this valuable data. A single social media platform may include millions of posts, organized into many different threads and posted by a combination of millions of different users. In many cases, conversations started on one platform may spill over onto another, different users may have different audiences, levels of influence, multiple usernames or multiple accounts, posts may express different sentiments or may be of varying levels of interest, etc. Many types of businesses stand to benefit greatly from tools for gathering and understanding social media data.

SUMMARY

A system and method is disclosed for measuring social media. Content posted by a user on one or more social media platforms is identified. The identifying the content posted by the user includes searching the one or more social media platforms for content posted by the user with identifying information. Downstream content associated with the content posted by the user is identified. Metrics measuring a contributor weight of the user based on the downstream content are calculated.

Figure 1:
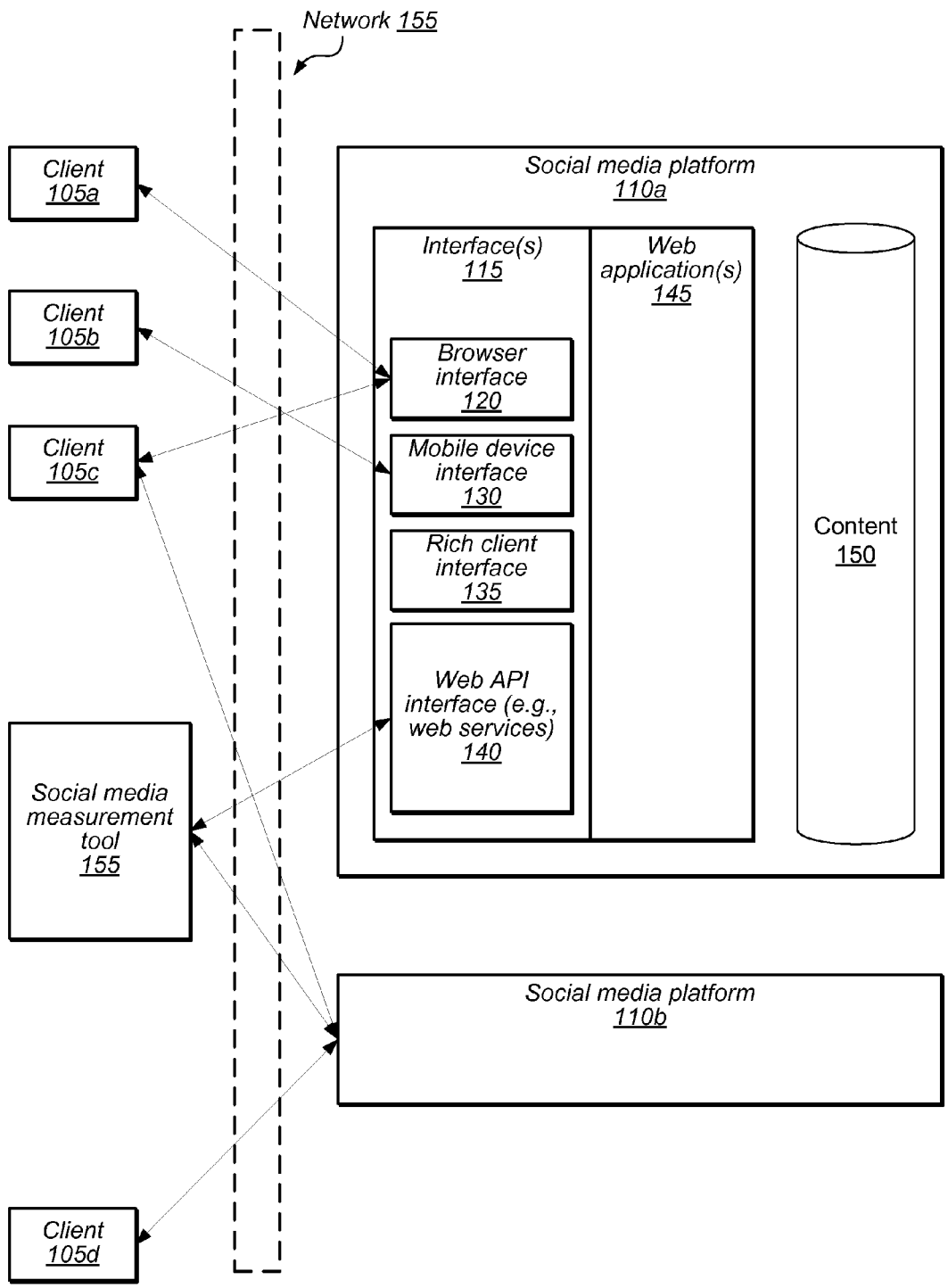
FIG. 1 illustrates a social media infrastructure, including multiple clients interacting with multiple social media platforms over a network, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

DETAILED DESCRIPTION OF EMBODIMENTS

Social media marketers use various tools to monitor content on social media platforms and to thereby gauge and influence consumer sentiment. For example, given a keyword or phrase, such tools may retrieve content (e.g., posts) that contains the given keyword or phrase from various social media platforms. Posts that include a given keyword or phrase of interest may be referred to herein as directly relevant.

However, directly relevant content represents only a fraction of the overall relevant content. This is due to the conversational nature of social media discussions. Directly relevant posts, which contain the keyword(s) of interest, may be only the start of much larger conversations. For example, users may post replies to directly relevant posts as well as replies to those replies and so forth. Such response chains may sometimes spill onto multiple social media platforms, creating even more relevant content. Therefore, by capturing only content that directly mentions a given keyword or phrase, traditional social media marketing ignores downstream content that is still relevant to the keyword(s) of interest even if it does not mention the keyword(s) directly.

According to various embodiments, a social media measurement tool may be configured to receive keywords (e.g., one or more supplied words or phrases) from a user and in response, to identify, gather, aggregate, and/or analyze social media data that is relevant to the keywords from one or more social media platforms, including both directly relevant and downstream content. As used herein, the term directly relevant content may refer to content that includes one or more given keywords identified as relevant, while the term downstream content may refer to content that is conversationally relevant to the directly relevant content (e.g., replies to relevant content, replies to those replies, content referencing other relevant content, etc.), which in some cases may not include the one or more given keywords.

Embodiments further enable users of social media measurement tools to identify contributor weight or influence in social media. By analyzing content hosted on social media platforms, users of a social media measurement tool identify individual users who exhibit particular influence over the discussion of particular topics on a single social media platform or multiple platforms, or identify users who are generally influential in a particular social media platform. Using these measures of contributor weight, the sentiment of influential users is monitored in some embodiments, and communications are targeted to influential users in some embodiments. Use of these measures of contributor weight is also used in some embodiments to assess the commercial value of communications target to those users.

FIG. 1 illustrates a social media infrastructure, including multiple clients interacting with multiple social media platforms over a network, according to some embodiments. The illustrated infrastructure includes two social media platforms 110a and 110b. Social media platforms, such as 110, provide users with forums on which to post content, view content, and/or react to content posted by other users. In various embodiments, such platforms may include Blogging sites (e.g., Blogger™), microblogging tools (e.g., Twitter™), social networking communities (e.g., Facebook™, MySpace™, LinkedIn™, etc.), video sharing sites (e.g., YouTube™), photo sharing sites (Flickr™), discussion forums, and various other tools that enable users to post, view, and/or react to user-generated content.

In the illustrated embodiment, social media platform 110a may be independent of social media platform 110b. That is, each platform may be autonomously administered by different entities (e.g., different companies) and may or may not share content or interact with one another.

In the illustrated embodiment, social media platform 110a, includes content 150, and one or more web applications 145 configured to access the content. Content 150 may include various user-generated content (e.g., posts, replies), user-generated metadata (e.g., relationships among users, post ratings), system-generated metadata (e.g., usage statistics, analytics data, etc.), and possibly other information.

In various embodiments, content 150 may be stored in one or more databases, on one or more computers of a compute cluster, datacenter, and/or any other hardware configuration. In some embodiments, social media platform 110a may include various internal APIs (e.g., RDBMS, software libraries, etc.) for internal access to content 150 by one or more web applications 145.

As used herein, the term web application refers to any software program and/or logic accessible by one or more clients from over a network. For example, in some embodiments, web applications 145 may include code executable to implement a social networking website (e.g., Facebook™) that a client (e.g., clients 105a-105c) may access from across a network (e.g., network 155) via a browser interface (e.g., browser interface 120) that is configured to receive HTTP requests from a browser executing on a client. In some such embodiments, the social networking website application may be configured to respond to client requests by sending HTML to the corresponding client via browser interface 120.

In some embodiments, a social media platform, such as 110a, may include various other web applications 145 and/or interfaces 115. For example, client 105b may be executing a mobile application (e.g., an application on a mobile phone) that is configured to access a mobile-platform specific web application of 145 via a mobile-platform specific interface, such as interface 130. Similarly, interfaces 115 may include one or more rich client interfaces (e.g., 135), web API interfaces (e.g., 140), and/or other interfaces. In various embodiments, different web applications may expose multiple interfaces of one or more types to clients from over the network.

As shown in FIG. 1, different social media platforms 110 may service different and/or overlapping sets of users. For example, while clients 105a and 105b are users of social media platform 110a, client 105d uses only social media platform 110b. However, client 105c interacts with both social media platforms.

According to various embodiments, social media measurement tool 155 may access, retrieve, aggregate, and/or analyze social media content (e.g., 150) stored on one or more social media platforms 110. For example, in some embodiments, social media measurement tool 155 may be configured to query social media platform 110a via web API 140, such as a web services interface, to retrieve content relevant to a given keyword or phrase of interest. As used herein, the term keywords refers to any word, phrase, or other logical combination of words/phrases, such as those including negations, AND, OR, exclusive OR, regular expressions, etc.

In some embodiments, Web API interface 140 may be implemented as a web service that uses one or more protocols, such as Representational State Transfer (REST) or Simple Object Access Protocol (SOAP), to exchange messages with clients, such as social media measurement tool 155. In some embodiments, social media measurement tool may be configured to access content 150 via other interfaces, such as browser interface 120.

According to the illustrated embodiment, social media measurement tool 155 may gather data from both social media platforms 110a and 110b. Social media platform 110b may include any or all of the components depicted in social media platform 110a, including respective content, one or more web applications, and one or more interfaces to those web applications. In various embodiments, social media measurement tool 155 may access each of the social media platforms 110 using the same or different types of interfaces. For example, if social media platform 110a includes a robust Web API interface, such as 140, while social media platform 110b includes only a browser interface, social media measurement tool 155 may be configured to utilize the appropriate respective interface for accessing each platform.

Figure 2:
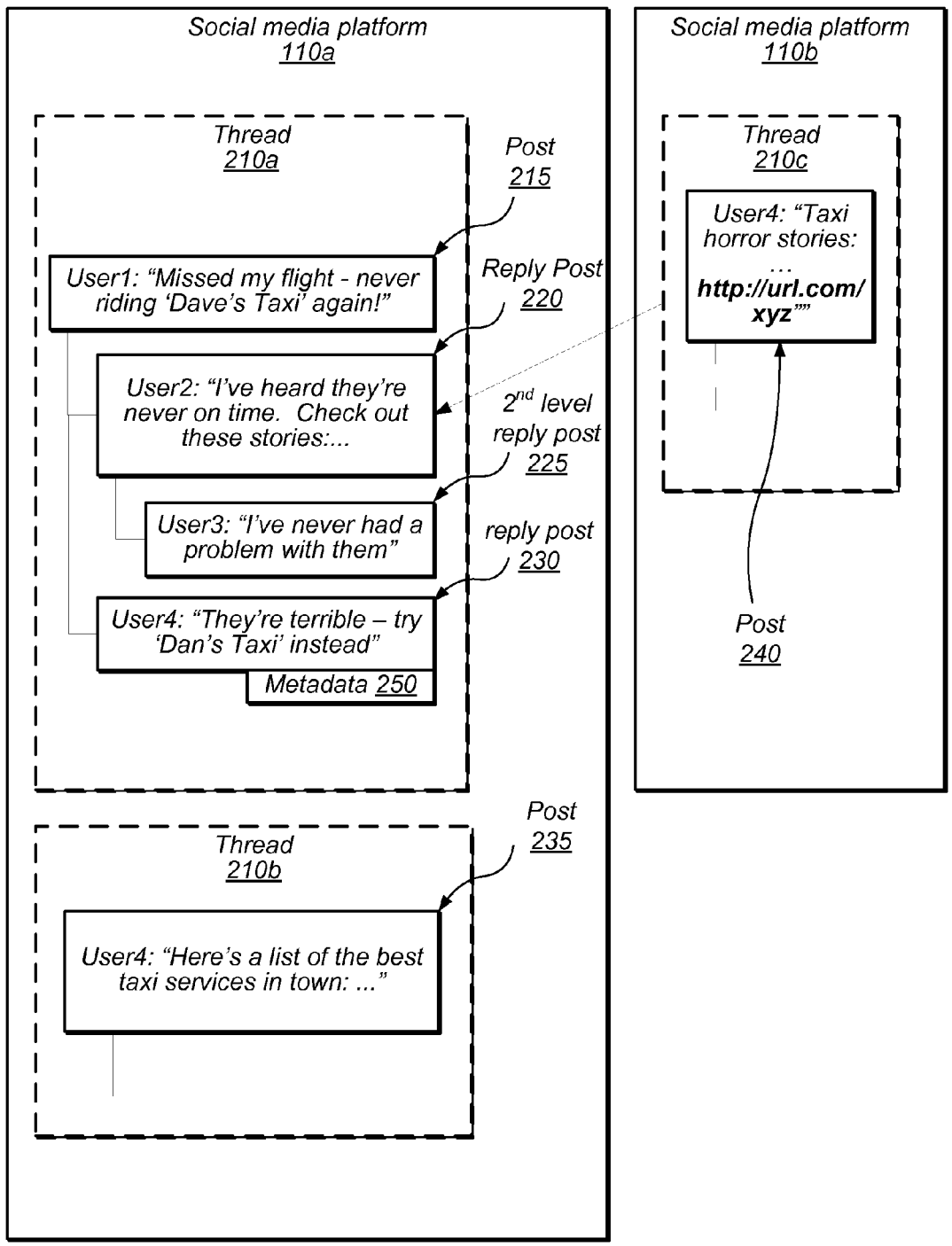
FIG. 2 illustrates examples of user-generated content on two social media platforms, according to various embodiments.

FIG. 2 illustrates examples of user-generated content on two social media platforms, according to various embodiments. Social media platforms 110a and 110b of FIG. 2 may correspond to social media platforms 110a and 110b in FIG. 1.

According to the illustrated embodiment, social media content may be arranged into multiple conversational threads, such as threads 210a-210c. Each thread may comprise any number of user posts, where each post includes some content, such as text, pictures, video, audio, and/or other types of multimedia. As used herein, the term post may be used to refer both to independent posts (e.g., 215, 235, and 240) and to reply posts (e.g., 220, 225, 230), which are posted in response to other posts. As illustrated in thread 210*a*, replies in a given thread may be arbitrarily deep. As indicated in FIG. 2, each post may contain some content generated by and attributable to a corresponding user of the social media platform. For example, post 215 is a textual comment posted by user1.

As indicated in FIG. 2, posts on a social media platform may be associated with respective metadata, such as metadata 250. In various embodiments, such metadata may include system generated metadata (e.g., author of the post, time/date of the post, relationships between posts) and/or user-specified metadata (e.g., relationships between posts, rating or flagging of the content in a post, etc.). For example, metadata 250 may include indications that reply post 230 is a reply to post 215 and was posted at a given date/time. In addition, metadata 250 may include an indication that User4 is the author of the post, such as by associating post 230 with a unique identifier corresponding to User4. Metadata 250 may indicate the number of times that a post has been viewed or provide a listing of users having viewed or forwarded the post. System-generated metadata may further include location identifiers (e.g., URLs) for similar (e.g., by keyword analysis) or identical (e.g., forwarded or copied) content.

In various embodiments, users of social media platform 110*a* may determine the author of a given post by viewing various identifying information about the author, such as a unique username, a not necessarily unique screen name, a picture, and/or other information. In different embodiments, different information identifying the author of each post may be programmatically available via different interfaces, such as a Web API.

In some situations, a user of the social media platform may author numerous posts, which may appear in one or more threads. For example, in the illustrated embodiment, User4 is the author of both reply post 230 and of post 235, which appear in threads 210*a* and 210*b* respectively.

In many situations, a user may participate in numerous social media platforms. For example, in the illustrated embodiment, User4 participates in both social media platform 110*a* and 110*b*. However, a given user may sometimes have different identifying information across different social media platforms (e.g., different username). Therefore, it may be difficult to recognize when two posts on two different platforms (e.g., posts 230 and 240 on platforms 110*a* and 110*b* respectively) are authored by the same person. According to various embodiments, the social media measurement tool 155 may leverage various user-stitching techniques described herein to ascertain that posts on multiple different social media platforms are actually authored by the same person and/or entity.

In some embodiments, content in one post may reference another post. For example, post 240 on social media platform 110*b* includes a URL that points to post 220 on social media platform 110*a*. In some situations, a user that embeds a URL in a post (e.g., post 240) may use a URL miniaturization service to reduce the length of the URL. An embedded URL may refer to another post on a different social media platform (as post 240 refers to post 220), to a post on a different thread of the same social media platform, or even to another post on the same thread.

In traditional social media data mining, an interested party (e.g., a marketer) may search a given platform for one or more keywords and find posts that directly include that keyword. For example, a marketer wishing to learn more about "Dave's Taxi" may query social media platform 110*a* for that business name. Using traditional search tools, the marketer may find only directly relevant content (e.g., only posts that contain the search phrase "Dave's Taxi", such as post 215). However, such traditional tools may ignore relevant downstream content, such as replies 220, 225, and 230, post 240 and its replies, and/or potentially post 235.

Embodiments further enable users of social media measurement tools to identify contributor weight or influence in social media on one or more of several varied metrics. For example, some embodiments identify contributor weight in terms of the number of replies to a post by a contributor. In the example portrayed with respect to FIG. 2, a scoring system based on the number of replies to a post by a contributor identifies the influence of user1 based on the number of replies to post 215. Likewise, some embodiments identify contributor weight in terms of the number of distinct users replying to a post by a contributor. In the example portrayed with respect to FIG. 2, a scoring system based on the number of users replying to a post by a contributor identifies the influence of user1 based on the number of users replying to post 215. Similarly, some embodiments identify contributor weight in terms of the sentiment of replies to a post by a contributor. In the example portrayed with respect to FIG. 2, a scoring system based on the sentiment of replies to a post by a contributor identifies the influence of user1 based on the number of users replying in agreement to post 215. As is discussed below, both with respect to FIG. 5 and elsewhere, embodiments accommodate other metrics. One of skill in the art will readily realize in light of having read the present disclosure that embodiments accommodate metrics for assessing contributor weight, other than those listed, without departing from the scope of the present disclosure. Further, in some embodiments, metrics used to identify contributor weight are user-configurable.

Figure 3:
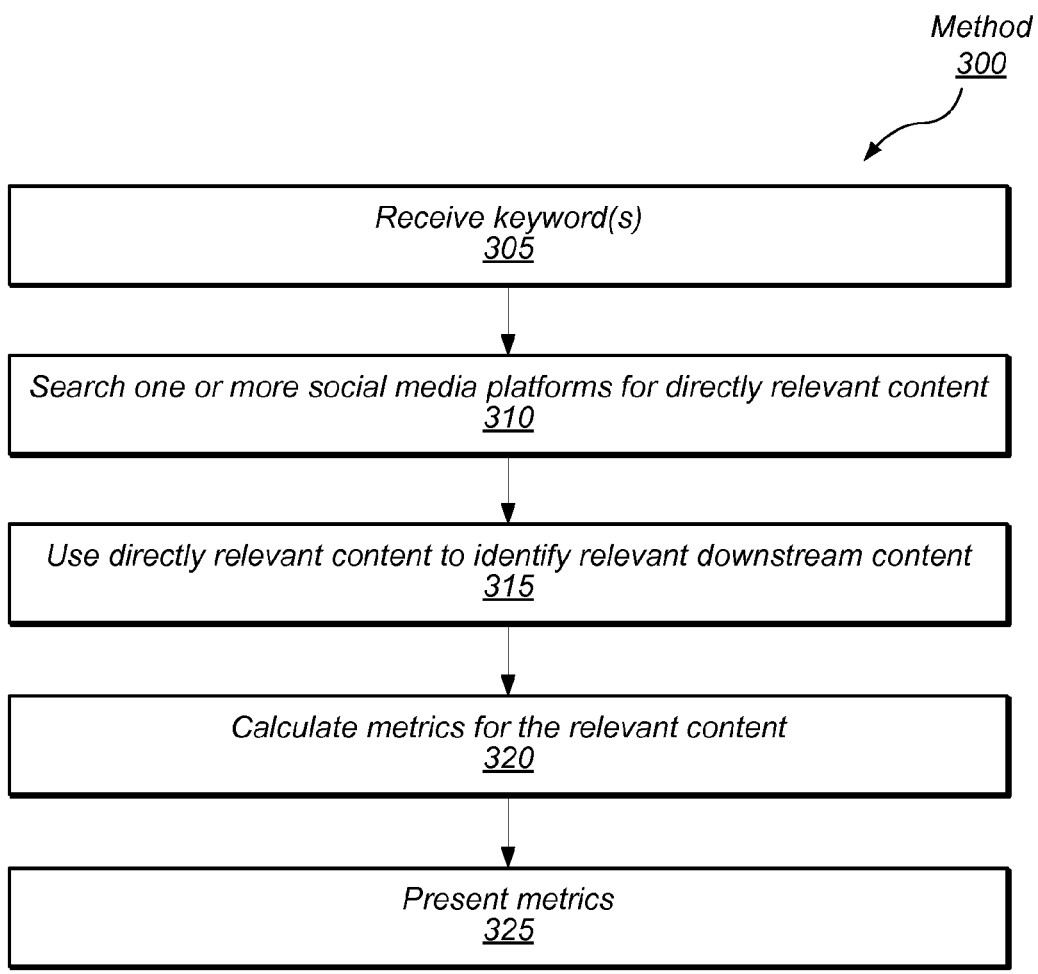
FIG. 3 is a flow diagram illustrating a method for identifying, aggregating, and analyzing both directly relevant content and relevant downstream content on one or more social media platforms, according to various embodiments.

FIG. 3 is a flow diagram illustrating a method for identifying, aggregating, and analyzing both directly relevant content and relevant downstream content on one or more social media platforms, according to various embodiments. The method of FIG. 3 may be executed by a social media measurement tool, such as measurement tool 155 of FIG. 1.

According to the illustrated embodiment, method 300 begins by receiving one or more keywords, as in 305. In some embodiments, the keywords may be input by the user, retrieved from another system, or be determined automatically as described below in relation to method 400. For example, the user may enter initial keywords of interest in 305, such as keywords that represent certain products or brands, keywords that represent marketing posts or press releases, or other keywords of interest. In some embodiments, such manual entry may include the user specifying logical operations for combining a plurality of keywords (e.g., AND, OR, NOT, etc.). These words may be of interest for various reasons (e.g., a company name, keywords that the user has bid on or is considering bidding on in an advertisement server environment, etc.).

In other embodiments, the tool may receive the keywords in 305 from another software application. For example, a user may bid on one or more keywords in an advertisement server environment using a bid management system (e.g., see FIG. 8). As part of various facilities to assist the user in selecting and/or evaluating one or more keywords, the bid management system may be configured to programmatically invoke the social media measurement tool 155, for example, via a Web API interface. As part of this invocation, the social media measurement tool may receive one or more keywords from the bid management system on which the user is bidding. This receiving may correspond to the receiving step of 305. In further embodiments, keywords received in 305 may be supplied by various other means.

According to the illustrated embodiment, after receiving the one or more keywords, the social media measurement tool may search one or more social media platforms for directly relevant content. For example, the tool may invoke various interfaces of different social media platforms (e.g., one or more of interfaces 115) to query the respective platforms for posts that include the keywords received in 305. The social media measurement tool may query different platforms using different interfaces, depending on the interfaces made available by each platform. By querying for keywords in 310, the tool is able to retrieve directly relevant content from the one or more queried sites.

In some embodiments, the measurement tool may allow a user to specify the social media platforms that the tool should search for content. For example, the social media measurement tool may present a user with a list of platforms. In some embodiments, a programmatic interface of the social media measurement tool may include parameters indicating the social media platforms that the tool should search.

Once the tool has gathered directly relevant social media content from the one or more platforms (as in 310) for the keywords received in 305, the tool may use the directly relevant content to identify relevant downstream content, as in 315. In various embodiments, the measurement tool may use metadata associated with the relevant posts and/or metadata (e.g., metadata 250) corresponding to the relevant posts to identify relevant downstream content.

For example, suppose that the keywords received in 305 include the keywords "Dave's Taxi". In this case, if the tool searches social platform 110a of FIG. 2 for the given keywords, the tool may determine in 310 that post 215 includes directly relevant content. Subsequently, the measurement tool may also determine (in 315) that posts 220 and 230 comprise relevant downstream content since both posts are responses to directly relevant post 215. In some embodiments, the measurement tool may determine that posts 220 and 230 are relevant downstream content by examining respective metadata corresponding to posts 215, 220, and/or 230. Such metadata may disclose the reply relationship between the posts. In other embodiments, the tool may examine metadata associated with thread 210a and/or other metadata in the system to discover the relationship between posts 215, 220, and 230.

Similarly, the tool may also determine that post 225 comprises relevant downstream content since post 225 is a reply to relevant post 220. Thus, post 225 may be considered a second level reply to post 215 since a reply path exists from post 215 to post 220 to post 225. In various embodiments, the social media measurement tool may consider any post on a reply path from another relevant post to itself be relevant. The set of all reply paths from a given post may be referred to herein as the reply tree of the given post.

In some embodiments, the measurement tool may use the content and/or metadata of relevant posts to identify new keywords and then search the one or more social media platforms for content directly related to the newly determined keywords. Using this technique, the measurement tool may identify content that may be considered a reply to other relevant content, and therefore, itself relevant. For example, since post 240 references post 220, posts 215, 220, and 240 may be considered a single reply path. Therefore, if the social media measurement tool determines that post 215 comprises directly relevant content, then it may also determine that both posts 220 and 240 comprise relevant downstream content. The technique of identifying that posts from across different threads are part of a single reply path may be referred to herein as conversation threading.

Figure 4:
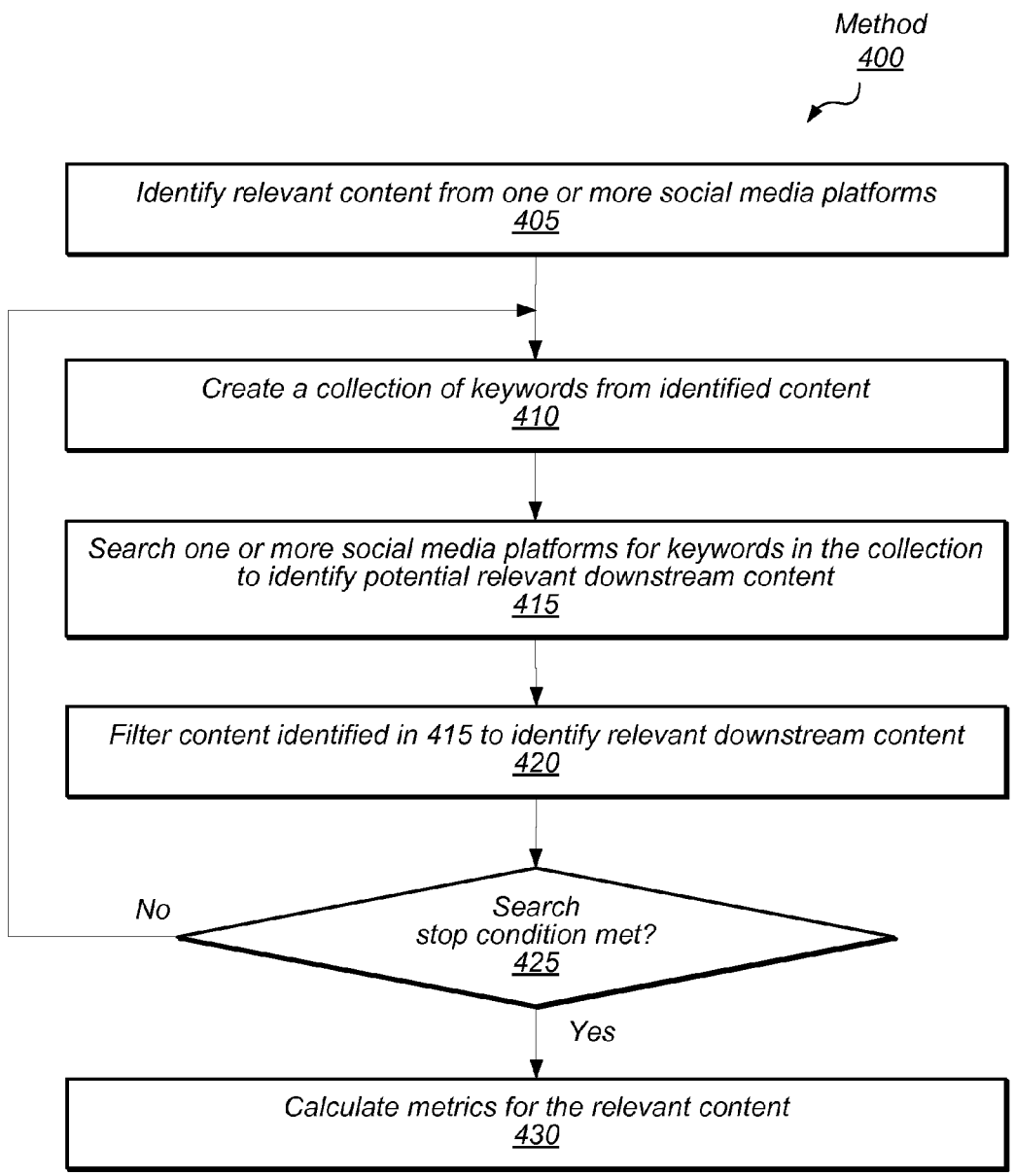
FIG. 4 is a flow diagram illustrating one example of a method implementing conversation threading, according to various embodiments.

FIG. 4 is a flow diagram illustrating one example of a method implementing conversation threading, according to various embodiments. In some embodiments, method 400 of FIG. 4 may be performed as part of identifying relevant downstream content in step 325 of FIG. 3.

According to the illustrated embodiment, method 400 begins by identifying at least some relevant content from one or more social media platforms, as in 405. For example, the tool may identify a post containing content that is directly relevant to a given one or more keywords and then identify some relevant downstream data, such as posts in the reply tree of the directly relevant post. In this initial iteration, the downstream posts may be in the same thread as the directly relevant post.

According to method 400, the measurement tool may then create a collection of keywords from the identified relevant content, as in 410. In some embodiments, the measurement tool may create a separate respective collection of keywords for each post identified as relevant. For example, for a given relevant post, the corresponding collection of keywords may include the metadata elements from the post, such as a post title, the author identifier, the author screen name, the social media platform, and/or other information usable to identify the given post.

In some embodiments, the collection of keywords created in 410 for a given post may include one or more URLs at which the given post may be accessed. In some circumstances, a given post may be accessible via multiple URLs, each of which may be included in the collection of keywords created by the measurement tool in 410 for the post. In some embodiments, the measurement tool may utilize one or more URL miniaturization services (e.g., tinyurl.com, bit.ly, is.gd, etc.) and/or URL miniaturization algorithms to generate miniaturized forms of one or more of the URLs and include the miniaturized forms of the URLs in the collection of keywords.

In some embodiments, the collection of keywords may include one or more words from the content of the post itself. For example, if the post includes various unique and/or otherwise interesting keywords, the tool may add those words to the collection of keywords for the post. For example, if the text of a given relevant post includes a full or miniaturized URL, this URL may be added to the collection of keywords for the post. In some embodiments, the measurement tool may consider content posted at such a URL to be relevant downstream content.

After generating a keyword collection for an identified relevant post, the measurement tool may search one or more social media platforms for the keywords in the collection, as in 415. Thus, the measurement tool may identify additional potential downstream content that may be relevant to the content identified in 405. For example, consider the content of FIG. 2. If the measurement tool receives the keywords "Dave's Taxi", it may determine in 405 that post 215 contains directly relevant content and that post 220 contains relevant downstream content. In 410, the tool may create a collection of keywords corresponding to post 220, which may include a URL at which post 220 can be accessed and one or more miniature versions of that URL. For example, one miniaturized version of the URL might be "http://url.com/xyz". In 415, the measurement tool may search social media platforms 110a and 110b for keywords in this collection (including the URLs and miniaturized URLs). Since post 240 includes the miniaturized URL, the measurement tool may identify post 240 as a part of a reply path from post 220 and therefore as potential downstream data that may be relevant.

In another example, some social media platforms (e.g., Twitter™) may associate each user with a respective audience of users to which the user can broadcast content. These may be referred to herein as audience-based platforms. In such platforms, if the user broadcasts content to his audience, users in the audience may have the option to view the content. Such platforms may allow a user to rebroadcast content that the user received from another user (e.g., "re-Tweet"). In some embodiments, by performing the search of 415, the tool may identify forwarded content as potentially relevant.

In 420, the measurement tool may filter the potential relevant downstream content to determine relevant downstream content. In various embodiments, the filtering step of 420 may include checking whether various exclusion conditions are met, such as by analyzing metadata and/or content of the potentially relevant posts. For example, in some embodiments, if the potentially relevant post is associated with metadata indicating that it was posted at an earlier date/time than was the relevant content identified in 405, then this potentially relevant post may be filtered (e.g., excluded) from the content identified in 415. Such rules may be arbitrarily complex: for example, the tool may be configured to filter out a potentially relevant post with an earlier date/time (as in the example above) unless relevant content directly references the post (e.g., includes a URL to the post). In different embodiments, various other exclusion criteria and/or combinations may be used to filter the content in 420.

Once additional relevant downstream content has been identified in 420, the measurement tool may decide whether to continue to recursively search for yet more downstream data. For example, if one or more stop conditions are not met (as indicated by the negative exit from 425), the method may include performing steps 410-420 for the newly identified downstream content, as indicated by the feedback loop from 425 to 410. In such cases, the method includes creating new collections of keywords for the additional content (as in 410), searching the one or more social media platforms for these keywords to identify potential downstream content (as in 415), and filtering the potential downstream content according to one or more exclusion rules (as in 420).

In different embodiments, the measurement tool may use different stop conditions to perform the decision of 425. For example, in some embodiments, the recursive search (e.g., feedback loop of 425 to 410) may continue until no new relevant downstream content is identified in 420 or until the tool has performed a maximum number of iterations of the feedback loop. In some embodiments, the measurement tool may continue to execute iterations of the loop for each reply path until the reply path has reached a maximum length or no more relevant content is found. In various embodiments, a user of the measurement tool may specify any of these or other criteria.

When the stop conditions of 425 are met, as indicated by the affirmative exit from 425, the measurement tool may calculate values for one or more metrics based on the relevant content, as in 430. Step 430 may correspond to 320 in FIG. 3. For example, in 430, the measurement tool may calculate one or more metric values for each post in the identified content. In some embodiments, the measurement tool may calculate metrics for various (possibly overlapping) groups of posts, such as all posts in a given thread, all posts in a given reply path, all posts in a given reply tree, all forwards of a given post, all direct replies to a given post, and/or for any other grouping.

Some examples of possible metrics are listed below. In various embodiments, the measurement tool may calculate respective values for one or more of these metrics for each post and/or for each group of posts:

Direct replies: The count of direct replies to a relevant post or group of posts Downstream replies: The count of downstream replies to a relevant post or group of posts (e.g., all replies in a reply tree of a given post, which may sometimes include posts in other threads and/or in other social media platforms).

Unique contributors: The number of unique authors of a given group of posts (e.g., thread, reply tree)

Unique visitors: The number of unique users that viewed a given post or group of posts Views: The number of times a given post or group of posts was viewed, not necessarily by unique users Audience: The number of unique users who have permission to view the given post or group of posts Audience contribution: The number of unique authors of a group of posts as a fraction of the total audience of the group of posts Audience interest: The number of unique visitors for a given group of posts as a fraction of the total audience for the group of posts Sentiment: What type of sentiment was expressed in the given post (e.g., positive, negative, neutral, etc.). For groups of posts, the measurement tool may list a metric of aggregate sentiment, such as a distribution of sentiments, average sentiment, and/or any other metric measuring the collective sentiment of the group of posts.

Forwarding velocity: For a given starting post and a group of forwards of that post (and forwards of those posts, etc.), the rate at which the forwards were posted. For example, if a given post (and/or forwards of that post) were forwarded a hundred times in a twenty five minute period, the tool may report a velocity of one forward per four minutes for that time period. In other embodiments, other measures of velocity are possible.

Reply velocity: Similar to forwarding velocity, but for a post and its direct replies and/or its entire reply tree. Some embodiments detect identify downstream content by identifying posts in one or more reply trees of content posted by a user.

Posts of interest: The number of posts that meet certain (e.g., user-customizable) criteria indicating that they are of interest to the user. For example, a user may configure the tool to determine that a post is of interest based on the length of the post, the date of the post, the content of the post, the identity of the author, the sentiment of the post, or any combination of these or other metrics.

Contributor weight: A measure of the degree of influence of the author of a post or the authors of a group of posts. Contributor weight for a group of posts may be a measure (e.g., average, median, sum, etc.) of the contributor weight of the authors of the group of posts.

Figure 5A:
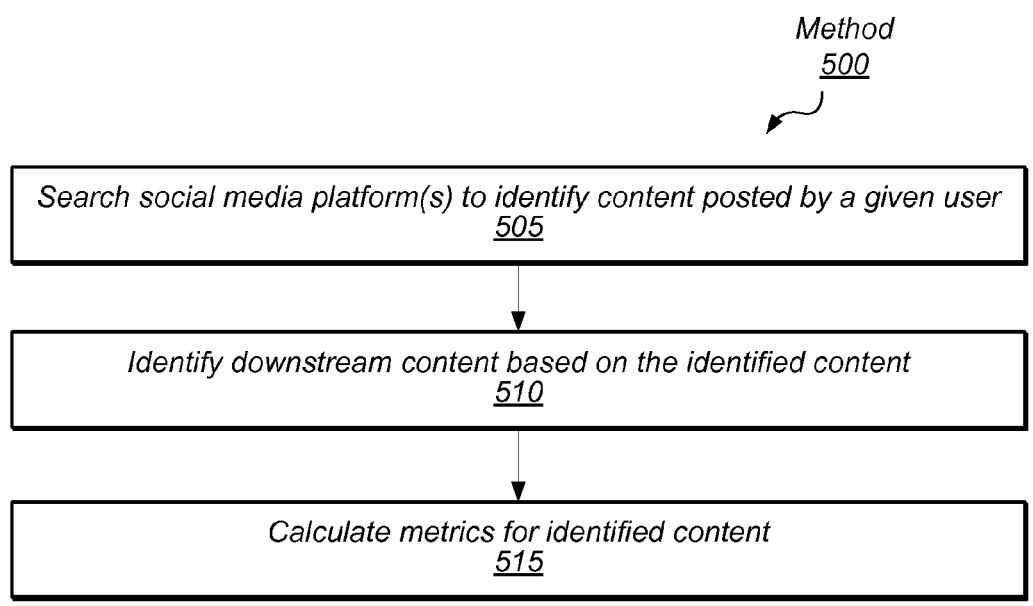
FIG. 5A illustrates a method for determining a contributor weight for a given user of one or more social media platforms, according to some embodiments.

FIG. 5A illustrates a method for determining a contributor weight for a given user of one or more social media platforms, according to some embodiments. The method of FIG. 5A may be performed by the social media measurement tool to determine a value for the contributor weight metric for one or more posts in 430.

According to the illustrated embodiment, method 500 begins by searching one or more social media platforms to identify content posted by a given user, as in 505. For example, the measurement tool may utilize various interfaces (e.g., interfaces 115) to find content posted by a user with particular identifying information (e.g., a given username, screen name, and/or other identifying information).

In some embodiments, the measurement tool may receive the identifying information as direct input from a user of the system, while in others the tool may automatically determine identifying information from various posts. For example, if the tool is attempting to determine the contributor weight of a given post and the social media platform makes the screen name of the author available via a query interface, the tool may attempt in 505 to identify other content posted by an author with the same screen name. More detail regarding how the tool may identify content that was posted by the same user on different social media platforms (e.g., user-stitching) are discussed below with regard to FIG. 6.

According to the illustrated embodiment, the tool may then use the identified content to identify various downstream content, as in 510. The tool may then use the identified content and/or downstream content to calculate metrics measuring a contributor weight, as in 520. The process of identifying contributor weight discussed above with respect to method 500 may be performed iteratively. For example, a social media measurement tool may identify relevant content, as in method 400 above, and then perform the steps of method 500 to determine contributor weight for each of the contributors identified as providing content in method 400.

In various embodiments, the weight of a given user may be dependent on the values of various metrics, including any of those listed above for measuring posts and/or groups of posts. For example, the tool may calculate values for any of the metrics listed above for any one or more posts posted by the user and/or for reply trees from those posts. For example, some metrics on which a contributor weight may be dependent may include one or more of:

Average thread size: The average number of posts in threads in which the user participates (e.g., posts content). As an example, in some embodiments that operate across multiple social media platforms, an absolute thread size is used as a measure of the influence of a contributor. Alternatively, some embodiments measure thread size with respect to threads initiated by a particular user.

Average relative thread size: The ratio of the average number of posts in threads in which the user participates (e.g., posts content) or threads that are initiated by the user to the average number of posts in threads of a given sample. Samples vary between embodiments. In some embodiments, the average number of posts in threads in which the user participates or threads initiated by the user is compared to an average for other threads related to the relevant keywords for the thread. Alternatively, the average number of posts in threads in which the user participates or threads initiated by the user may be compared to other threads on the same social media platform. Returning briefly to the example portrayed in FIG. 2, such embodiments might assign greater contributor weight to user1 than to user4, because thread 210a created by user1 is larger than the average thread on the social media platform 110a and thread 210a created by user1 is larger than either of the threads created by user4 on social media platform 110a and social media platform 110b.

Post count: The number of posts the user has contributed. In some embodiments, post count includes an aggregate post count across a set of social media platforms using user stitching, as described below. Additionally, in some embodiments, post count includes both posts initiating a thread and those replying in an existing thread. In some embodiments, posts initiating a thread and those replying in an existing thread are assigned different weights, and replies are sometimes weighted based on how early they appear in a thread.

Influential followers: In audience-based platforms, a measure of the weights of users in the contributor's audience (e.g., average weight, total weight, number of users with a weight above a given threshold, etc.). In some embodiments, an audience is composed of users of a social media platform indicating an affinity selection of the user (e.g., followers, friends or connections). In other embodiments, an audience is composed of persons reading content contributed by a user, without regard to an indication of affinity.

Forwards: A measure of the frequency with which posts by this user were forwarded to other users. In some embodiments, forwards include linking to the content posted by the user. In some embodiments, forwards include quotation, with or without attribution or linking to a source, of content by the user. Measurement of forwards can also include measurement of forwarding velocity.

Replies: A measure of the frequency with which other users replied to posts by this user. This measure may include direct replies and/or any other replies in different reply trees, etc. Measurement of replies also includes, in some embodiments, measurement of reply velocity and measure of the number of users replying to posts by the user. In some embodiments, measurement of replies includes measuring the average number of replies to posts by the user, and such measurements can be made with respect to content posted across multiple social media platforms.

Audience engagement: An audience contribution and/or interest measure (as discussed above with regard to measuring one or more posts) applied to one or more posts by the user and/or to reply trees from such posts.

Thus, by performing method 500, the social media measurement tool may measure a general contributor weight for a given contributor, or a weight for the given contributor within a given subject area (e.g., taxis) based, either in whole or at least in part, on downstream content. Marketers may use such contributor weight calculations to identify influential contributors and to assess the importance of various posts when posting their own comment (e.g., posting replies), presenting advertising content on social media platforms, or measuring sentiment on social media platforms.

As discussed above, the measurement tool may be configured to calculate contributor weights based on data gathered from one or more social media platforms (e.g., in 505). However, identifying content posted by the same person across multiple social media platforms may present special challenges, because the same person may use different aliases, screen names, or user names across different platforms.

In some embodiments, the social media measurement tool may utilize statistical inference techniques to determine that two users on two different platforms are actually the same user. Such techniques may be referred to herein as user-stitching. For example, in some embodiments, the tool may start by receiving the identity of a given user on a first social media platform. The tool may then use various interfaces of the platform to retrieve a profile for that user from the first platform. The profile may include different personal information about the user, such as the user's actual name, physical address, affiliated networks and/or organizations, interests, photographs, and/or other personally identifying profile data.

According to various embodiments, the tool may then search a second social networking platform(s) for the user name and/or for various other combinations of data retrieved from the profile information (e.g., real name and home city). In some embodiments, for each match, the tool may retrieve the matching user's profile from the second social media platform and compare various elements of that profile with those of the profile retrieved from the first social media platform. The tool may then utilize various statistical inference techniques for determining a probability that the matching user from the second social media platform is actually the same person as the user on the first social media platform.

In some embodiments, the tool may iteratively adjust these probabilities based on profiles found on other social networking platforms. For example, if the tool matches a first user account from a first platform with a second user account from a second platform, but the two user accounts list different screen names in their respective profiles, then the tool may assign the match a first probability. However, if a subsequent search finds a third user account on a third platform, where the third user account is a high probability match for the first user account, but has the same screen name as the second user account, the tool may revise upward the match probability of the first and second user accounts.

In various embodiments, the tool may perform various searches based on different combinations of user profile information. The searches that the tool performs may be dependent on the particular elements available in each profile, the number of matches found, the probabilities, and/or other stop conditions.

In some embodiments, the measurement tool may be configured to determine that two user accounts belong to the same person if the tool calculates the matching probability between the two accounts to be above a given threshold. In some embodiments, a user of the social media measurement tool may specify this threshold.

Figure 5B:
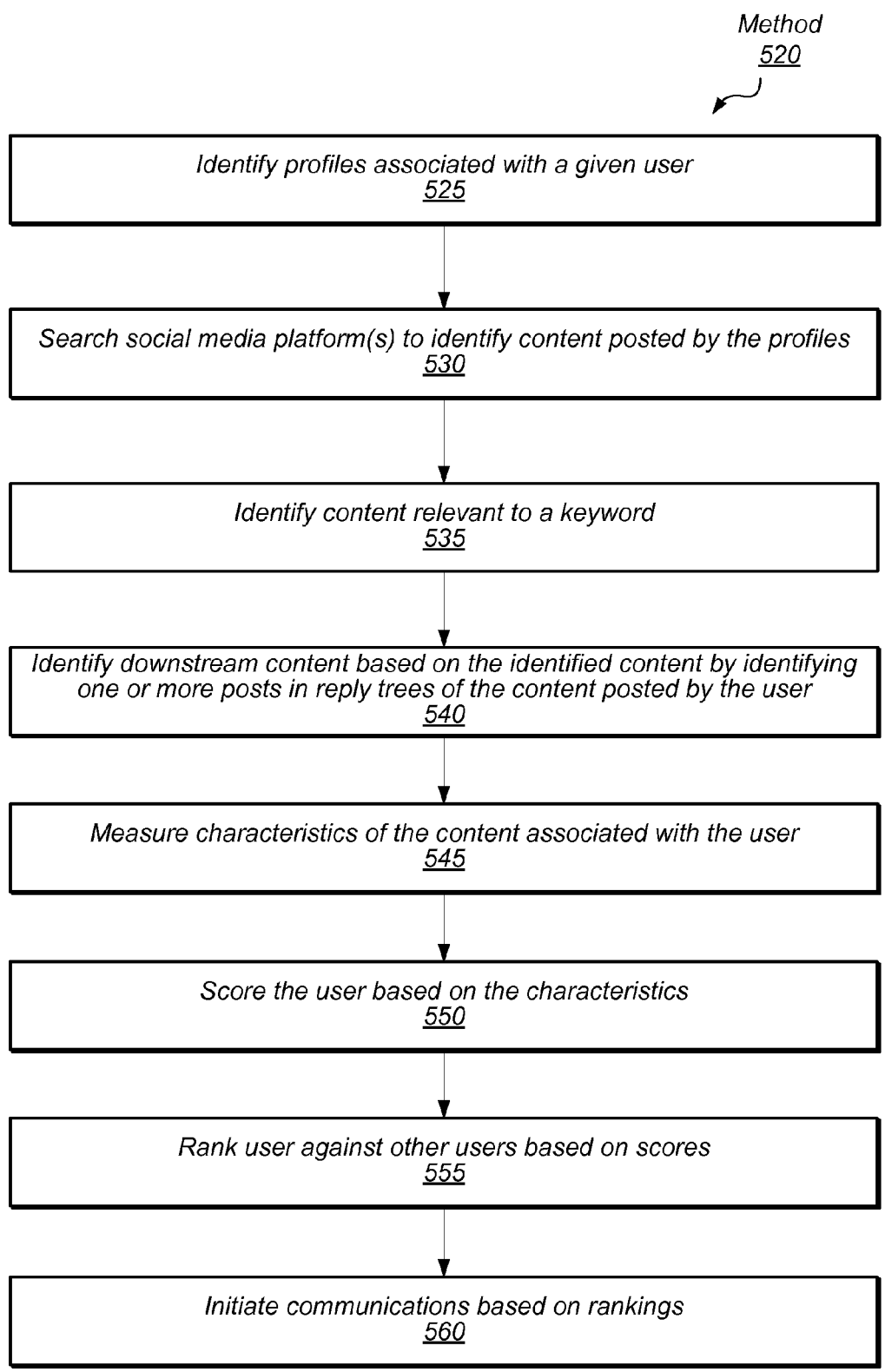
FIG. 5B depicts a method for targeting communications for a given user of one or more social media platforms, according to some embodiments, based on contributor weights.

FIG. 5B depicts a method for targeting communications for a given user of one or more social media platforms, according to some embodiments, based on contributor weights. According to the illustrated embodiment, method 520 begins by identifying profiles associated with a given user (525). Profiles on multiple social media platforms that belong to the same user are capable of being identified as described above and as described in further detail in copending U.S. patent application Ser. No. 13/035,286, which was filed on Feb. 25, 2011, the content of which is incorporated by reference herein in its entirety.

Social media platforms are then searched to identify content posted by the identified profiles (530). Content posted by the user that is relevant to a selected keyword is then identified (535). In some embodiments, a social media measurement tool may optionally filter the content identified in 525 according to one or more keywords. In some embodiments, a user of the measurement tool may supply such keywords to enable the tool to determine contributor weight based only on content that pertains to a given field or topic. For example, if the user wishes to determine contributor weight in a given subject (e.g., taxi services), the user may supply one or more keywords that are indicative of that subject (e.g., taxi, taxi OR cab, etc.) and in 530, the measurement tool filters the posts identified in 525 according to those keywords, such that posts that do not meet the specified keyword criteria are excluded. In some alternative embodiments, content is first identified for keyword relevance and users are then identified from the content identified for keyword relevance. Further, the content posted by the user on the one or more social media platforms that is relevant to the keyword may not contain the keyword, and, in some embodiments, the identifying content that is relevant to the keyword includes identifying the content that is relevant to the keyword based on a connection to downstream content in which the keyword appears.

According to the illustrated embodiment, the tool may then use the identified content to identify various downstream content by identifying one or more posts in the reply trees of content posted by a user (540). Characteristics of the downstream content, such as the metrics discussed above with respect to FIG. 4 and FIG. 5A, are calculated (545). A user is scored (i.e., assigned a contributor weight) based on the characteristics (i.e., metrics) calculated in 545 (550). The user is then ranked against other users based on scores for contributor weight (555). In some embodiments, ranking the user against other users includes identifying keywords with respect to which the user has particular weight. Likewise, a user may be ranked against other users on contributor weight with respect to a set of keywords. Communications are then initiated based on the rankings (560). Some embodiments target communications to or monitor postings by contributors with high contributor weight.

Figure 5C:
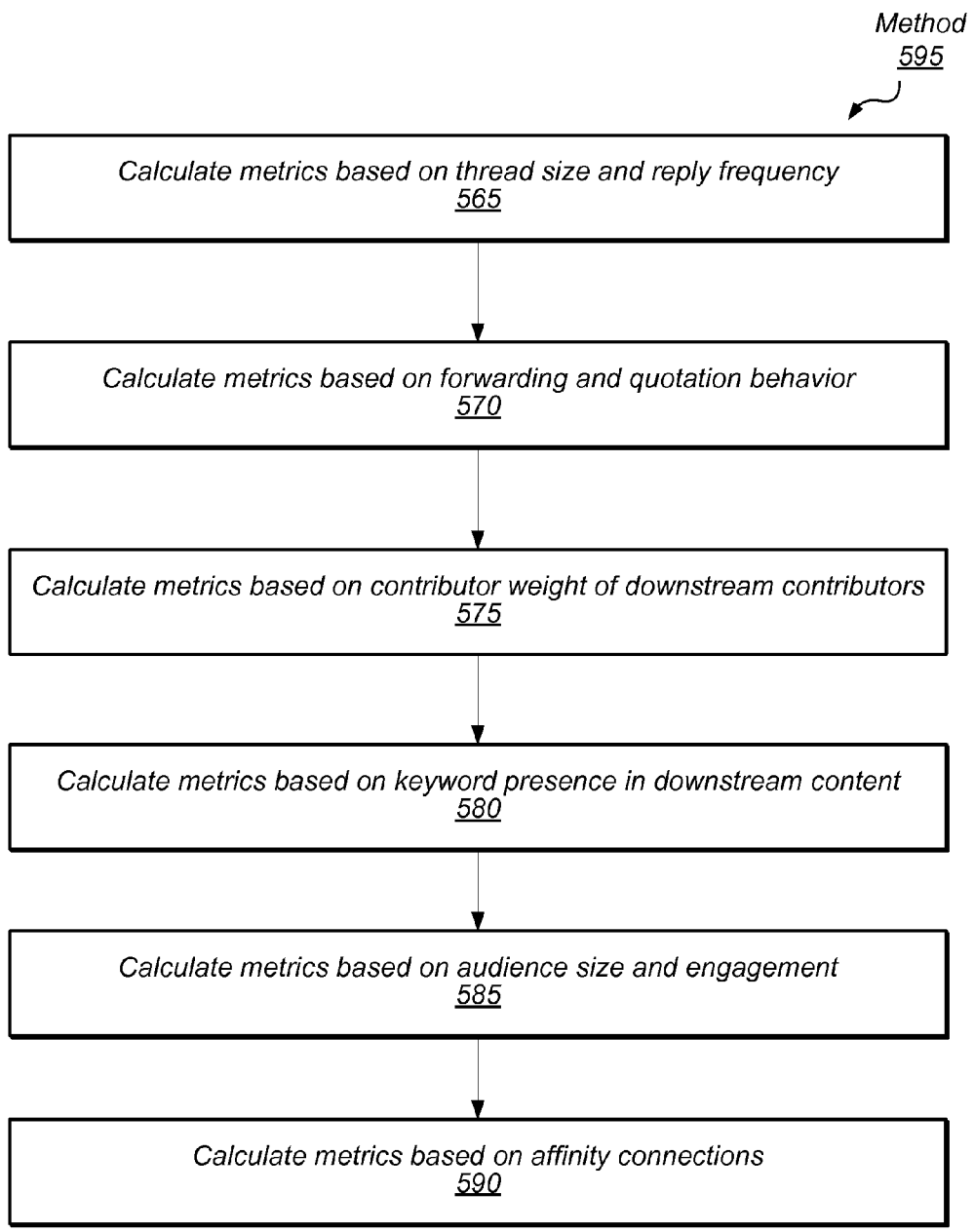
FIG. 5C illustrates a method for calculating factors influencing contributor weight for a given user of one or more social media platforms, according to some embodiments.

FIG. 5C illustrates a method for calculating factors influencing contributor weight for a given user of one or more social media platforms, according to some embodiments. Method 595 is, in some embodiments executed as part of calculating metrics or assigning contributor weight as in 520 and 545 above. One of skill in the art will readily realize, in light of having read the present disclosure, that the metrics listed in the present application are exemplary, rather than exhaustive, and that other metrics may be substituted, or only a subset of the metrics listed herein may be used, without departing from the scope of the present disclosure. Thus, portions of method 595 may be omitted, or other steps may be added, without departing from the scope of the present disclosure. Metrics based on thread size and reply frequency, as discussed above, are calculated (565) for posts by a user. Examples include average thread size, replies, and average relative thread size, discussed above with respect to FIG. 5A. Examples further include direct replies, downstream replies, and unique contributors, as discussed above with respect to FIG. 4.

Metrics based on forwarding and quotation behavior, as discussed above, are calculated (570) for posts by a user. Examples include forwards discussed above with respect to FIG. 5A. Examples further include forwarding velocity, as discussed above with respect to FIG. 4. Metrics based on contributor weight of downstream contributors, as discussed above, are calculated (575) for posts by a user. Examples include average influential followers, discussed above with respect to FIG. 5A. Metrics based on keyword presence in downstream content, as discussed above, are calculated (580) for posts by a user. Thus, in some embodiments, calculating the metrics measuring a contributor weight includes calculating metrics measuring a contributor weight of the user based on the downstream content containing a particular keyword. In some embodiments, the degree to which downstream users write posts with selected keywords may be measured and used as a metric for assessing contributor influence.

Metrics based on audience engagement, as discussed above, are calculated (585) for posts by a user. Examples include audience engagement discussed above with respect to FIG. 5A. Examples further include audience, audience contribution and audience interest, as discussed above with respect to FIG. 4. Metrics based on affinity connections, as discussed above, are calculated (590) for a user. Examples include number of connections and influence scores of those connections.

Figure 6:
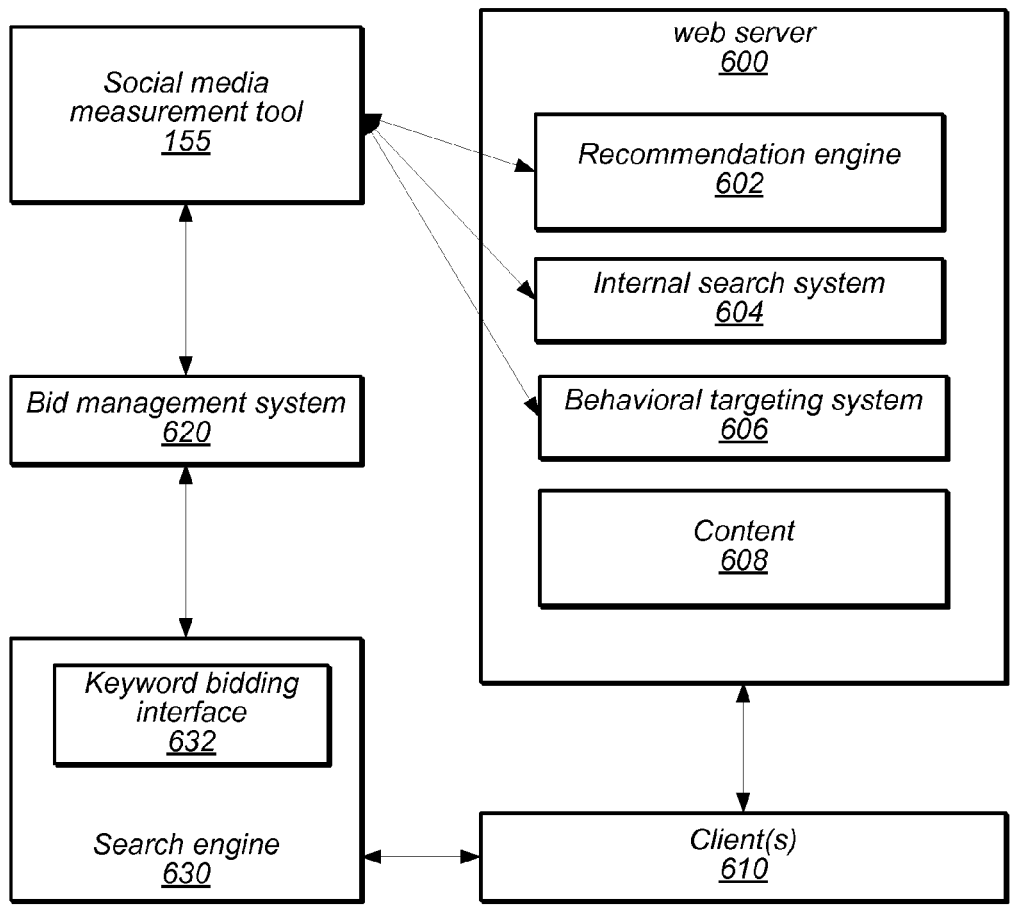
FIG. 6 is a block diagram illustrating a social media measurement tool and a variety of components configured to utilize the social media measurement tool, according to various embodiments.

FIG. 6 is a block diagram illustrating a social media measurement tool and a variety of components configured to utilize the social media measurement tool, according to various embodiments. In the illustrated embodiment, any of the depicted components (600-630 and/or 155) may be executing on a separate or the same physical machine. For example, in some embodiments, the social media measurement tool may be installed as a software component on the same physical server as either web server 600 and/or as ad server 620. In another embodiment, the measurement tool 155 may execute as a service on a separate physical server that is accessible by either web server 600 or ad server 620 from across a network (e.g., Internet, Local Area Network, etc.). In the latter example, web server 600, ad server 620, and/or various other clients of the social media measurement tool 155 may be configured to request social media measurements from the tool using various query mechanisms and/or interfaces (e.g., web services API). As such, social media measurement tool 155 may be implemented as wide-area network service, which may service requests from different client machines, in different administrative domains, and/or owned by different entities.

For purposes of clarity the embodiment illustrated in FIG. 6 is explained assuming that each component (measurement tool 155, ad server 620, web server 600, and clients 610) is executing on a different respective computer and that the computers are configured to communicate with one another over a network. The arrows connecting the illustrated components signify communications, any of which may take place across one or more networks (e.g., Internet, LAN, WAN, etc.). However, given the benefit of this disclosure, those skilled in the art will recognize that in different embodiments, various ones of the components depicted in FIG. 6 may be executing on the same or different physical or virtual machines.

According to some embodiments, web server 600 may be configured to serve web pages to clients (e.g., 610) over a network. For example, web server 600 may be configured to implement an e-commerce website where clients 610 may browse and purchase products. The web server 600 may be configured to serve content 608 at least in part, by executing various components and/or applications, such as recommendation engine 602 and internal search system 604. Such components may be implemented as components of a web application or as separate components. During operation, each of recommendation engine 602 and internal search system 604 may query or otherwise interact with social media measurement tool 155 to obtain social media measurements during the course of their operation.

Consider for example, recommendation engine 602. Many companies use recommendation engines, such as 602, to provide applicable recommendations to users. Such recommendations may traditionally be based on the items the user has already purchased or viewed, taking into account correlations the company has observed between purchases made by other users. However, traditional approaches are limited in that correlations are only built on local data, which may be biased by site configuration and/or may be insufficient for making meaningful recommendations.

According to various embodiments, a recommendation engine, such as 602, may be configured to communicate with social media measurement tool 155 to gain insight into social media trends and thereby recommend related products, or to recommend products based on the identify of a user. For example, in some embodiments, an administrator of the recommendation system may associate one or more keywords with each product available for sale on the e-commerce site. When the recommendation engine needs to determine one or more products to recommend but lacks sufficient data with which to form such a recommendation, the engine may query the social media measurement tool for data relevant to each of the keywords associated with different possible products. In response, the measurement tool 155 may collect and analyze social media data related to each of the keywords and send such data, metrics, or analysis to the recommendation engine. The recommendation engine may use the received data to determine which product to recommend. For example, in some embodiments, the recommendation engine may calculate a "buzz" score for each keyword or collection of keywords associated with each product. The recommendation engine may then use these metrics to calculate a buzz score for each product and recommend the products with the top buzz scores. Alternatively, if a user is identified as an influencer with respect to a particular line of products based on social media metrics, a product in that line may be recommended to the user or offered at a steep discount.

In some embodiments, the web server (or a different web server) may include an internal search system, such as 604. Websites often include internal search functionality that allows users to enter a keyword or phrase and be presented with a list of search results (e.g., content) from the website that are related to the given keyword or phrase. The order in which these results are displayed may influence which result the user will select and therefore affects which section of the site the user will visit. It may be desirable for an internal search system, such as 604, to present the results in an order that will drive the most conversion (e.g., most sales) on the site. Thus, results may be presented based on a listing of keywords with respect to which the user has particular influence, and likely has considerable interest, and pricing may be adjusted to reflect that interest.

According to various embodiments, an internal search system, such as 604, may query social media measurement tool 155 to determine social media trends, which the search system may use in determining an order for presenting search results. In some embodiments, this process may be similar to that used by the recommendation engine. For example, an administrator of the internal search system may associate one or more respective keywords with different sections of the web site (e.g., with each page, group of web pages, portion of a web page, etc.). When a user performs a search, the internal search system may retrieve the search results, determine the keywords associated with each retrieved result, and query the measurement tool to determine the respective levels of popularity regarding each set of keywords. The internal search system may then present the search results to the user in an order dependent on the determined levels of popularity.

For example, consider a retail clothing store website that includes an internal product search system that allows users to search for various products matching different keywords and be presented with related products being sold on the site. According to some embodiments, the user may enter the search term "jeans", and the internal search system may respond by retrieving a standard set of product results related to that word. Then, the search system may query the social media measurement tool for the keywords associated with each site section on which the results reside. If, for example, the term "Jean shorts" has the most mentions for the last week, then search results on a site section associated with the term "Jean shorts" may be displayed earlier on the search results page than are other search results on sections associated with less popular keywords. Likewise, if a particular user is an influencer with respect to "Jean shorts," results for particular jean shorts may be shown to the user, and charge for placement of the results may be billed to a party that has bought such a placement.

In some embodiments, the web server (or a different web server) may include a behavioral targeting system, such as 606. Companies may use traditional behavioral targeting systems to serve applicable content to users based on previous user behavior. As users continue to use a website, the targeting system may learn more about the user and provides content (e.g., advertisements) that is better tailored to that particular user, based on the user's behavior. However, at times, the system may not know much about the user (e.g., the user's first visit).

According to some embodiments, a behavioral targeting system (e.g., 606) may query the social media measurement tool 155 to gauge the popularity of different servable content, according to social media trends. As with the internal search system, in some embodiments, an administrator may associate each portion of content servable by the behavioral targeting system 606 with one or more keywords. When the behavioral targeting system 606 attempts to determine which portion of content to serve (e.g., needs to choose a banner advertisement to serve in a pre-defined space), the behavioral targeting system 606 may query the social media measurement tool 155 with the keywords associated with potential content. As with recommendation engine 602 and internal search system 604, behavioral targeting system 606 may choose to serve the content that is most popular, as indicated by the response data sent by social media measurement tool 155.

For example, consider a banking website that includes a large piece of screen real estate reserved for targeted advertisements on a given page. The displayed advertisement could include any of the several different products or services offered by the bank, depending upon the user's interests and history. However, for a first-time visitor, the system may not have a user history. According to some embodiments, in such a situation, the behavioral targeting system may search the social media networks using sets of keywords that correspond to different advertisements available to serve. So for example, if the measurement tool indicates that the keyword "refinance" is a highly popular keyword over the last month on several social media platforms, the behavioral targeting system may serve to the user an advertisement for refinancing.

Another example of a system that may be configured to utilize social media popularity measurements provided by measurement tool 155 may be a bid management system, such as 620. A popular form of advertising for many companies is Search Engine Marketing (SEM) where the company purchases various keywords or phrases from a search engine, such as search engine 630 (e.g., Google™, Yahoo™, etc.) and associates different advertisements with the purchased keywords. When the search engine receives client requests to search for one or more of the purchased keywords, it may serve one or more of the advertisements as part its response.

Often, such search engines allow advertisers to purchase keywords by bidding on them via a keyword bidding interface, such as keyword bidding interface 632. When serving advertisements that match the keywords, the search engine may choose to serve only a limited number of advertisements, which correspond to the highest bids for the particular keywords. Furthermore, the order in which the advertisements appear on a search page may also be dependent on the respective bid amounts. Some search engines employ even more complex schemes, whereby the advertisers pay respective amounts for impressions of a given advertisement (the number of times the given advertisement is shown) and for clicks on the advertisements (the number of times a user follows a link associated with the advertisement to view the advertised content). Therefore, advertisers are interested in evaluating keyword purchases, discovering the most effective keywords, and discovering an optimal bid price for them. Embodiments allow for additional billing to be assessed in keyword bidding interface 632 with respect to advertisements shown to influencers with respect to the keywords.

Advertisers sometimes use bid management systems, such as 620, to automatically track the effectiveness of bids and bid on new keywords. For example, bid management system 620 may be configured to track the costs associated with purchasing each keyword and the revenue generated on an advertised website as a result of purchasing the keyword. The bid management system may then report these metrics to the advertiser, suggest bid amounts for each keyword, and/or bid on particular keywords automatically. The bid management system may interface with a keyword bidding interface of a search engine, such as bidding interface 632 with search engine 630 and may allow for premium bidding for display of ads to influencers.

According to various embodiments, a bid management system (such as 620) may be configured to consider social media measurements when evaluating various keywords on which to bid. For example, bid management system 620 may be configured to track a given set of keywords on which the user is currently bidding or on which the user is considering bidding. Such keywords may be referred to herein as SEM keywords.

The bid management system may be configured to query social media measurement tool 155 for respective measurements regarding various ones of the SEM keywords that the bid management system is tracking. The bid management system may then present the respective measurements to a user to inform the user's bidding decisions. For example, for different SEM keywords, the bid management system may present such social media measures as the number of directly relevant posts (e.g., those that contain the keyword), number of relevant posts (e.g., those that contain the keyword plus downstream posts relevant to those), sentiment of the relevant posts, contributor influence of posters of the relevant posts, audience contribution, audience interest, and/or various other ones of the metrics discussed above. In some embodiments, the bid management system may further combine/process the measures gathered from the social media measurement tool to derive other relevant measures of popularity for each keyword.

In various embodiments, the bid management system may present such metrics to a user according to different organizations. For example, bid management system 620 may break out the measures according to each keyword, respective collections of keywords in different advertising campaigns, respective groups of keywords being bid on at different search engines, user-specified collections of keywords, and/or any other groupings that may help the user determine appropriate bidding behavior.

In some embodiments, the bid management system may utilize the social media measurements acquired from social media measurement tool 155 (or measures derived from those acquired from the measurement tool) to determine whether to automatically bid on various keywords, whether to increase or decrease bid amounts on various keywords, or whether to otherwise modify automatic bid behavior. For example, the bid management system may be configured to enforce a policy whereby it would automatically increase a bid amount of a keyword if it determines that the keyword is receiving a significant spike in social traffic.

In addition to discriminating between different possible SEM keywords, in some embodiments, bid management system 620 may be configured to utilize social media measurements to discover new SEM keywords. Using this functionality, advertisers may discover new keywords on which to bid and/or on which a bid management system may automatically bid.

Figure 7A:
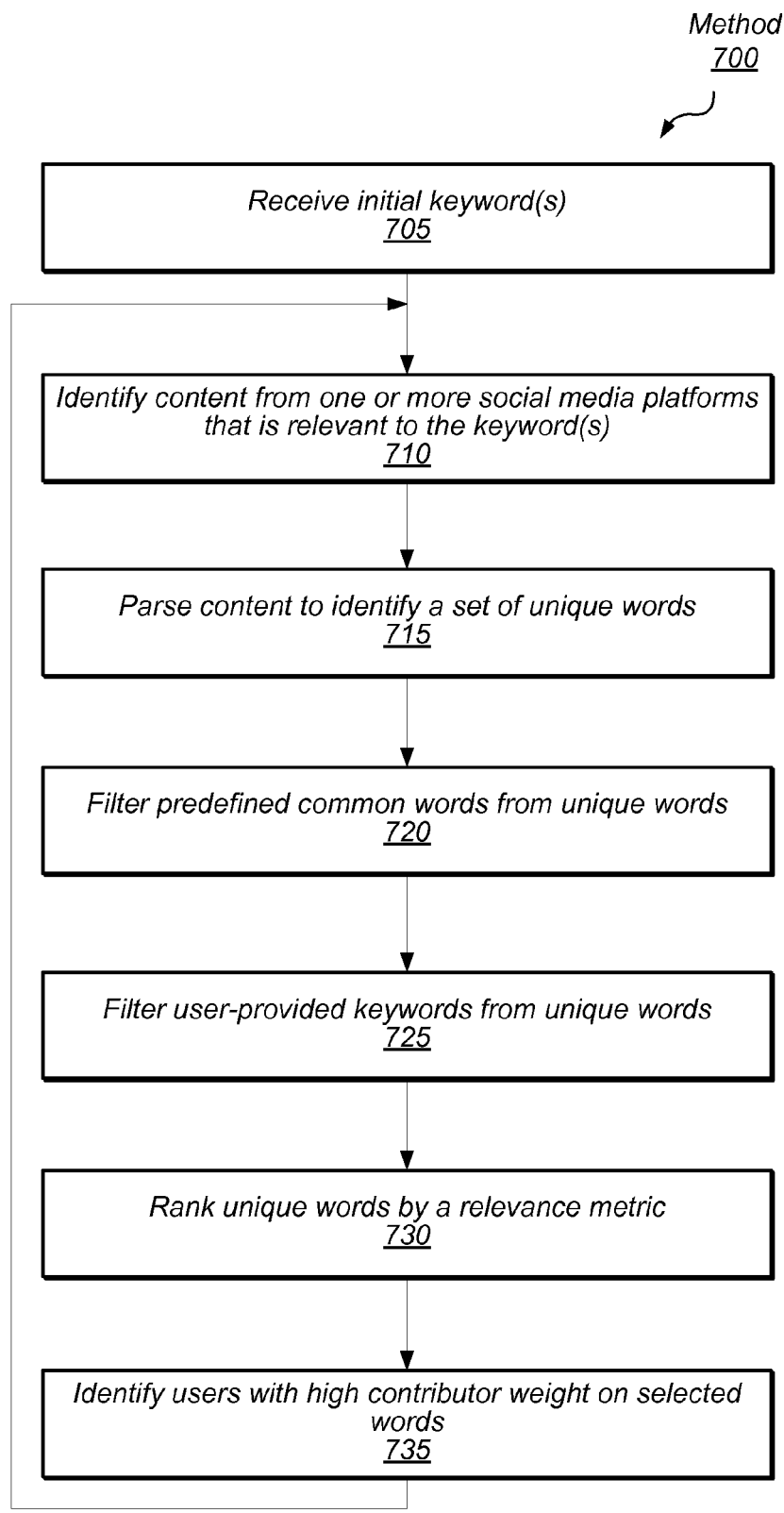
FIG. 7A is a flow diagram illustrating a method for discovering related keywords using social media data, according to various embodiments.

FIG. 7A is a flow diagram illustrating a method for discovering related keywords using social media data, according to various embodiments. For purposes of explanation, the description of method 700 below describes an embodiment in which a social media measurement tool performs the method. However, in other embodiments, method 700 may be performed in whole or part by a social media measurement tool (e.g., 155), by a bid management system (e.g., 620), or a combination thereof. Additionally, in various embodiments, the social media measurement tool may perform method 700 to identify related keywords from social media data for purposes other than SEM keyword bid management.

According to FIG. 7A, method 700 begins when the measurement tool receives one or more initial keywords, as in 705. In some embodiments, these keywords may correspond to SEM keywords received from a bid management system, such as those SEM keywords on which a user of the bid management system is currently bidding.

In 710, the measurement tool may use the keywords to identify content on one or more social media platforms that is relevant to the keywords received in 705. The content identifies in 710 may comprise directly relevant content and/or relevant downstream content as described above. For example, in some embodiments, step 710 may correspond to method 400 of FIG. 4. In some embodiments, the measurement tool may be configured to create different combinations of the keywords received in 705 and attempt to also identify content in 710 that is relevant to these different combinations.

In 715, the measurement tool may then parse the content identified in 710 to identify a set of unique words that appear in the content. In 720, the tool may filter common words (e.g., 'a', 'the', etc.) from the set of unique words identified in 715. The set of common words to filter may be predefined, specified by the user, and/or adaptively derived by the measurement tool. In some embodiments, the tool may also filter the initial keywords received in 705 from the set of unique words, as in 725.

According to 730, the measurement tool may then rank the remaining keywords in the set by a relevance metric, as in 730. The measurement tool may then identify users with high contributor weight on the selected words, as in 735. For example, in some embodiments, the tool may rank the remaining keywords by respective number of occurrences in the content identified in 710. In other embodiments, the relevance metric may include a more complex calculation, such metrics dependent on the number of unique posts that include the word, the number of unique threads that include the word, the size of the audience that has viewed at least one post containing that word, the contributor weight (e.g., as determined in FIG. 5A-5C) of contributors that have posted that word, etc.

In some embodiments, the tool may return the words and their respective ranks to the bid management system. In various embodiments, the bid management system may present the top N ranked words to the user, perform further analysis on those words, and/or bid on those words according to a given bidding policy.

In some embodiments, the measurement tool may be configured to identify additional keywords by performing steps 710-735 recursively (as indicated by the feedback loop from 735 to 710), each time using the top ranking words identified in the previous iteration. For example, after performing a first iteration of method 700, the measurement tool may identify the top ten keywords by a given relevance metric and then repeat steps 710-735 using those top ten words as input instead of the initial keywords received in 705. Using this recursive approach, the measurement tool may discover additional and/or yet more relevant keywords. In various embodiments, method 700 may terminate upon executing a predefined number of iterations, after a given iteration does not identify any new keywords in the top set, and/or another condition is met.

In some embodiments, the tool may consider user feedback when determining relevance. For example, the bid management system may allow a user viewing the suggested keywords to remove or accept the suggestion. Subsequently, the bid management system may indicate these choices to the measurement tool, which may use them to guide subsequent performances of method 700. For example, in a step such as 720, the tool may filter out one or more keywords that have been previously rejected by a user of the bid management system.

As discussed above, the bid management system may suggest the keywords identified in method 700 to a user. Such presentation may include various metrics or analyses to help the user understand the social media measurements that were used to arrive at the keyword suggestion.

In some embodiments, the bid management system (e.g., 620 of FIG. 6) may be configured to estimate the effectiveness of various keywords that the user is considering, such as those suggested by the social media measurement tool, as in FIG. 7. For example, in some embodiments, the bid management tool may attempt to predict the effectiveness of various SEM keywords, at least in part, by analyzing historical data for keywords with similar social media metrics and similar users with similar contributor weight.

Figure 7B:
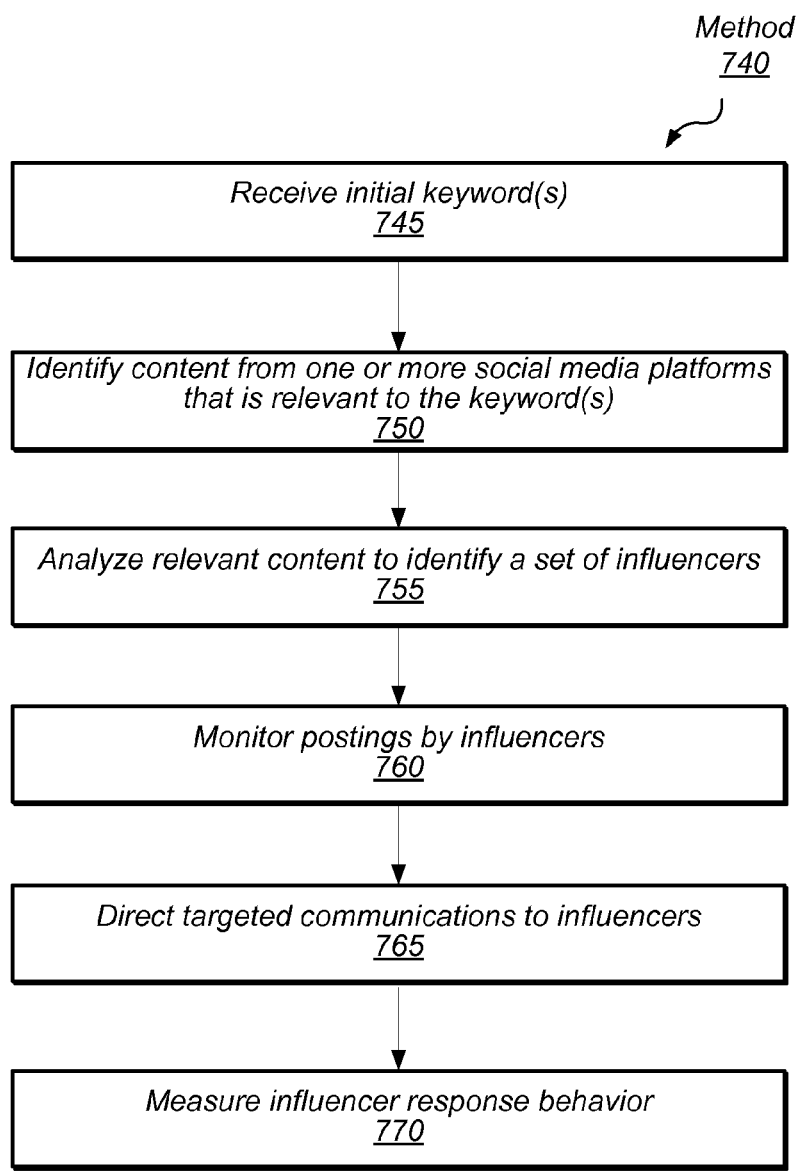
FIG. 7B is a flow diagram illustrating a method for targeting communications for a given user of one or more social media platforms, according to some embodiments, based on contributor weights.

FIG. 7B is a flow diagram illustrating a method for targeting communications for a given user of one or more social media platforms, according to some embodiments, based on contributor weights. For purposes of explanation, the description below describes an embodiment in which a social media measurement tool performs the described operations. However, in other embodiments, such operations may be performed in whole or part by a social media measurement tool (e.g., social media measurement tool 155 of FIG. 1), by a bid management system (e.g., bid management system 620 of FIG. 6), or a combination thereof. Additionally, in various embodiments, asocial media measurement tool may perform the described operations to direct targeted content to users from social media data for purposes other than SEM keyword bid management.

As presented in FIG. 7B, the measurement tool receives one or more initial keywords (745). In some embodiments, these keywords may correspond to SEM keywords received from a bid management system, such as those SEM keywords on which a user of the bid management system is currently bidding.

The measurement tool may use the keywords to identify content on one or more social media platforms that is relevant to the received keywords (750). The content identified in 750 may comprise directly relevant content and/or relevant downstream content as described above.

The measurement tool may then parse the content identified in block 750 to identify a set of influencers who have significant influence over content on the various social media platforms related to the keywords (755).

The measurement tool may then monitor postings associated with the profiles of the influencers (block 760). For example, in some embodiments, the tool may monitor changes in content associated with the profiles belonging to particular identified users, or monitor content posted by the user with respect to a set of keywords based on a contributor weight with respect to the set of keywords.

Targeted communications may then be directed to the influencers (block 765). Influencer response behavior may then be measured by monitoring changes in the content associated with selected profiles (block 770). Embodiments may target advertising content to the user based on a contributor weight with respect to a set of keywords and sentiment expressed in the downstream content. In some embodiments, measurement of influencer response behavior may include calculation of metrics designed to measure the effectiveness of the targeted communications directed to the influencers.

Figure 8:
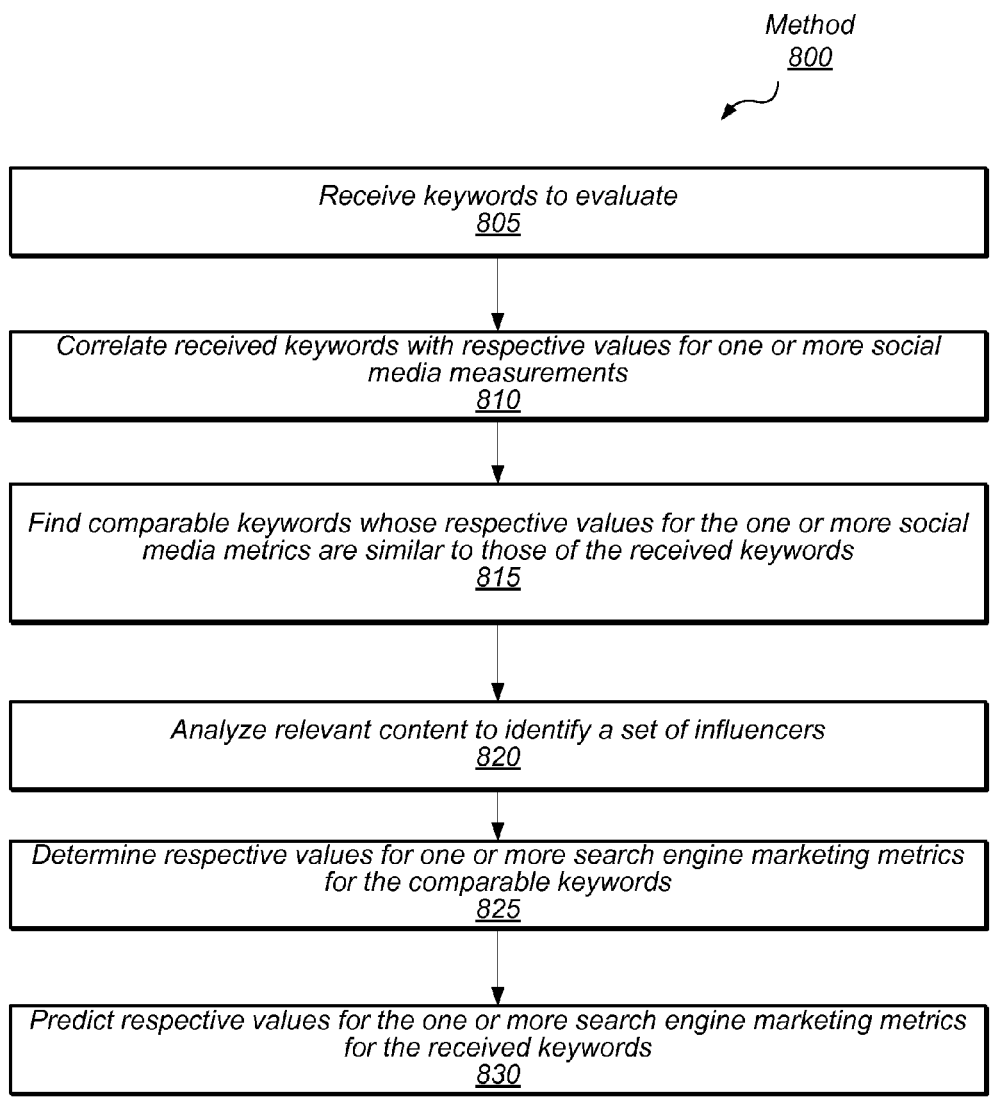
FIG. 8 is a flow diagram illustrating a method for predicting the effectiveness of SEM keywords using social media measurement, according to various embodiments.

FIG. 8 is a flow diagram illustrating a method for predicting the effectiveness of SEM keywords using social media measurement, according to various embodiments. The method of FIG. 8 may be performed by a bid management system, such as 620, or other SEM keyword analysis systems configured to communicate with a social media measurement tool, such as 155.

According to the illustrated embodiment, method 800 begins by receiving a group of initial keywords for evaluation, as in 805. For example, these keywords may correspond to a group of SEM keywords that a user of the system is tracking or that were suggested by social media measurement tool 155, as shown in FIG. 7A.

In 810, the bid management system correlates the received keywords with respective values for one or more social media measurements. As discussed above, the bid management system may be configured to communicate with social media measurement tool 155 to determine various measures for each keyword it tracks.

In 815, the bid management system locates comparable keywords for comparison. That is, for each received keyword, the system may identify one or more comparable keywords whose social media measurements are similar to those of the received keyword. In some embodiments, the comparable keywords may correspond to those on which the bid management system is currently bidding, has bid in the past, or for which the bid management system can otherwise obtain SEM metrics (e.g., return on advertising spend).

In 820, the bid management system analyzes the relevant content to identify a set of influencers. In 825, the bid management system may determine respective values for one or more search engine marketing metrics (e.g., return on advertising spend) for the comparable keywords identified in 815. If the bid management system has bid on these comparable keywords before, it may have stored such data as part of its normal operation. If the system did not bid on these comparable keywords before, it may retrieve historical SEM statistics from a repository of such data. SEM metrics may include any metrics usable to assess the effectiveness of a keyword in an SEM campaign.

In 830, the system attempts to predict SEM metric values for each word receive in 805. To do this, the system may use various statistical inference techniques to determine a correlation between the social media metric values of the comparable keywords and their SEM metric values. Using this statistical model, the system may attempt to predict SEM metric values for each of the received keywords, given the social media metric values of those keywords. In some embodiments, parts of the SEM metric values are based on the identity and characteristics of the influencers.

Figure 9:
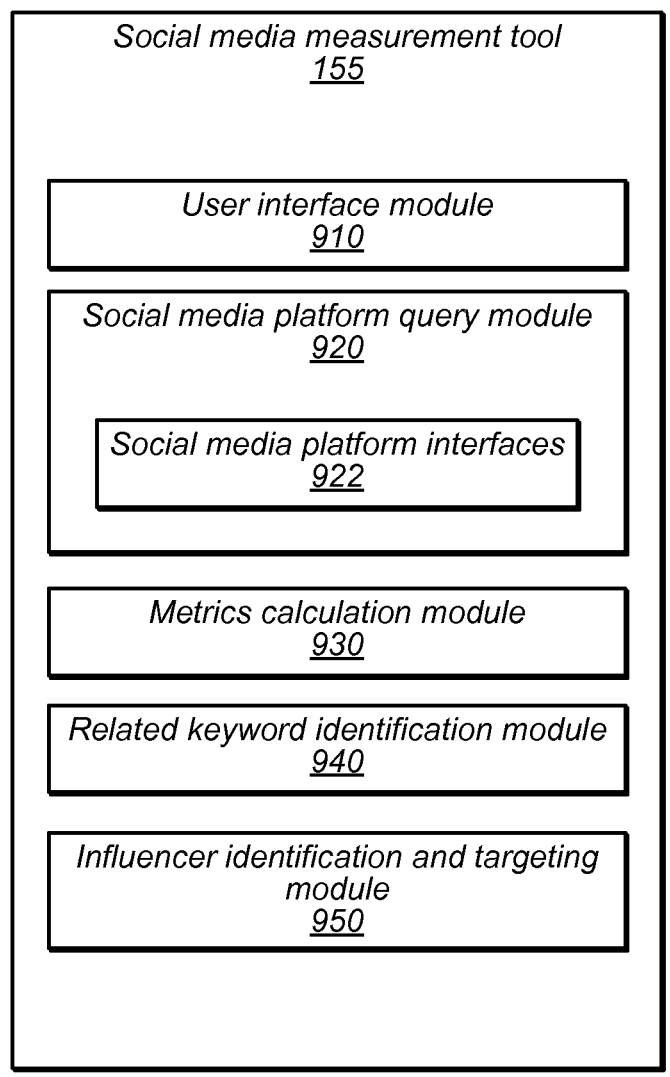
FIG. 9 is a block diagram illustrating the various components of a social media measurement tool 155, according to some embodiments.

FIG. 9 is a block diagram illustrating the various components of a social media measurement tool 155, according to some embodiments. FIG. 9 illustrates a configuration of only some embodiments; in other embodiments, the measurement tool 155 may include fewer or additional components. Various ones of the illustrated components may be combined or separated further into additional components.

According to the illustrated embodiment, social media measurement tool 155 may include a user interface module, such as 910. The user interface module may be configured to display a graphical user interface to a user and to accept input from the user. The particular nature and/or arrangement of the graphical user interface may depend on the particular implementation of the social media measurement tool. For example, if the tool is implemented as a web application, user interface module 910 may be configured to receive HTTP requests from clients, to compose HTML responses that describe a user interface, and to return those responses to the user. The user interface may then be displayed by a web browser on the user's machine. In other embodiments, if the measurement tool is implemented as a web service, then user interface module 910 may be configured to receive HTTP requests (e.g., web services invocation) and to send back HTTP responses that may not describe a graphical user interface. In yet other embodiments, the social media measurement tool may be implemented as a local, stand-alone application. In such embodiments, the user interface module 910 may implement a local graphical user interface, which may detect user input events generated by the user. In some embodiments, user interface module may be configured to receive requests for data, such as from bid management system 620 or web server 600, including recommendation engine 602, internal search system 604, and/or behavioral targeting system 606.

According to the illustrated embodiment, social media measurement tool 155 may also include social media platform query module 920. Query module 920 may be configured to query one or more social media platforms using one or more social media platform interfaces, such as 922. Interfaces 922 may each correspond to a respective social media platform, which the interface may query using one or more of the social media platform's interfaces, such as interfaces 115 of platform 110a in FIG. 1. For example, interfaces 922 may include a Web API interface for querying the social media platform Facebook™, via a web services interface of that platform. Thus, social media platform query module 920 may query various social media platforms to identify content that is relevant to various keywords, as described herein.

In the illustrated embodiment, measurement tool 155 includes a metrics calculation module 930, which may be configured to calculate different measurements of given social media content, as described herein. For example, metrics calculation module 930 may analyze content retrieved by query module 920 to determine values for various social media measurement metrics, as described herein.

Social media measurement tool 155 also includes related keyword identification module 940, which may be configured to interact with query module 920 to identify keywords related to other keywords as indicated by social media content on one or more platforms. In some embodiments, the one or more keywords may be received by the user interface module (e.g., specified by a user, included in a request from a bid management system, etc.) and passed to the related keyword identification module 940. Module 940 may then utilize query module 920 to retrieve content relevant to those keywords and parse the content to determine one or more related keywords, as described herein. An influencer identification and targeting module 950 may be used perform to identify, monitor, and communicate with influencers, as well as to price communications with such influencers, as described above.

Figure 10:
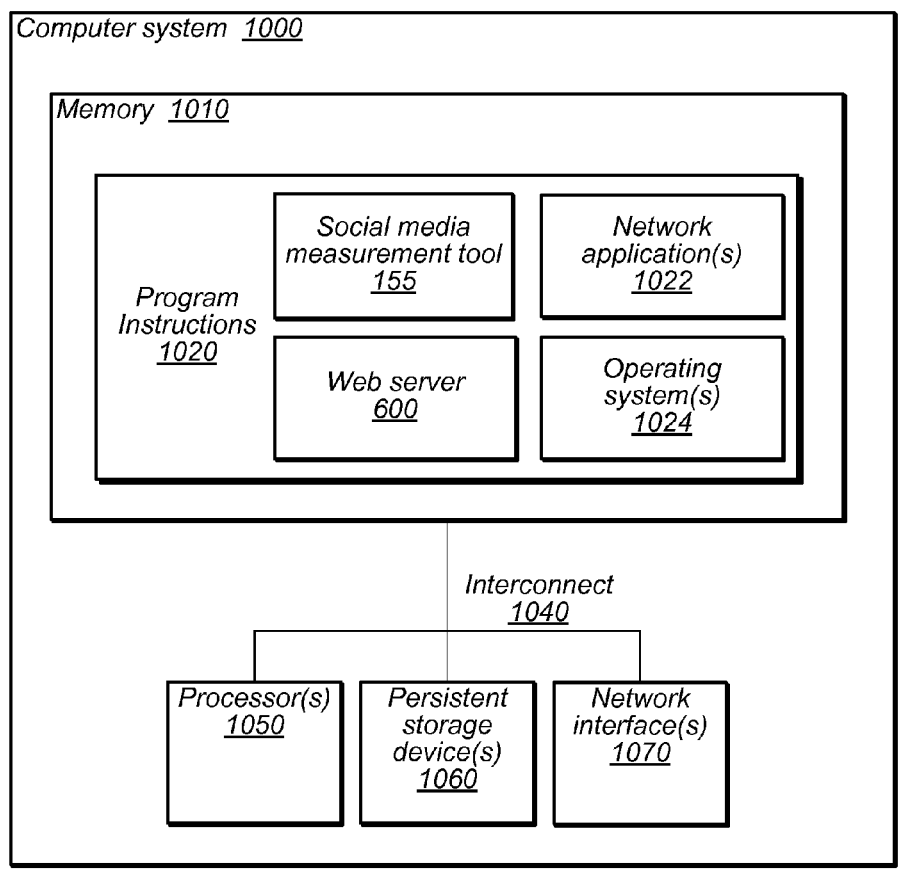
FIG. 10 is a block diagram illustrating a computer system configured to implement a social media measurement tool as described herein, according to various embodiments.

FIG. 10 is a block diagram illustrating a computer system configured to implement a social media measurement tool as described herein, according to various embodiments. The computer system 1000 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The social media measurement tool, bid management system, web server, and/or other components described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 1000 may include one or more processors 1050, each of which may include multiple cores, any of which may be single or multi-threaded. The computer system 1000 may also include one or more persistent storage devices 1060 (e.g. optical storage, magnetic storage, hard drive, tape drive, solid state memory, etc), which may persistently store data such as retrieved social media content. The system may also include one or more network interfaces 1070, which may be usable to communicate with users, clients, and/or social media platforms across a network (e.g., Internet).

According to the illustrated embodiment, computer system 1000 may include one or more memories 1010 (e.g., one or more of cache, SRAM, DRAM, RDRAM, EDO RAM, DDR 10 RAM, SDRAM, Rambus RAM, EEPROM, etc.). The one or more processors 1050, the storage device(s) 1060, network interfaces 1070, and the system memory 1010 may be coupled via interconnect 1040. Various embodiments may include fewer or additional components not illustrated in FIG. 10 (e.g., video cards, audio cards, additional network interfaces, peripheral devices, a network interface such as an ATM interface, an Ethernet interface, a Frame Relay interface, monitors, keyboards, speakers, etc.).

One or more of the system memories 1010 may contain program instructions 1020. Program instructions 1020 may be encoded in platform native binary, any interpreted language such as Java™ byte-code, or in any other language such as C/C++, Java™, etc or in any combination thereof. Program instructions 1020 may include program instructions to execute various components, such as social media measurement tool 155, servers 600, various network applications 1022 (e.g., recommendation engine 602, internal search system 604, behavioral targeting system 606, etc.), operating system 1024, and/or other software components. As described above, in various embodiments, the system need not include every one of these software components.

In some embodiments, memory 1010 may include any number of in-memory variables and data structures, such as those used to temporarily store retrieved social media content, to calculate social media metrics from the content, and/or to perform other calculations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer-implemented method, comprising:
   determining, by a computing device, identifying information associated with a user;
   identifying content posted by the user on one or more social media platforms by searching the one or more social media platforms for content that is:
      posted by the user with an account associated with at least a portion of the identifying information; and
      relevant to a keyword not contained in the content, the relevancy being based on a connection to downstream content in which the keyword appears;
   identifying downstream content associated with the content posted by the user; and
   calculating, by the computing device, metrics measuring a contributor weight of the user based on the downstream content associated with the content posted by the user.

2. The computer-implemented method of claim 1, wherein the calculating the metrics further comprises:
   measuring characteristics of downstream content associated with the user; and
   scoring the user based on the characteristics.

3. The computer-implemented method of claim 1, wherein the identifying the downstream content includes identifying one or more posts in one or more reply trees of the content posted by the user.

4. The computer-implemented method of claim 1, further comprising:
   identifying a plurality of social media profiles associated with the user,
   wherein the identifying content posted by the user on the one or more social media platforms further comprises searching the one or more social media platforms for content posted using a respective one of the social media profiles associated with the user.

5. The computer-implemented method of claim 1, wherein the calculating metrics further comprises calculating metrics based on influence scores of contributors to the downstream content.

6. A non-transitory computer-readable storage medium having instructions stored thereon that, if executed by a computing device, cause the computing device to perform operations comprising:
   determining identifying information associated with a user;
   identifying content posted by the user on one or more social media platforms by searching the one or more social media platforms for content that is:
      posted by the user with a profile including at least a portion of the identifying information; and
      relevant to a keyword not contained in the content, the relevancy being based on a connection to downstream content in which the keyword appears;
   identifying downstream content associated with the content posted by the user; and calculating metrics measuring a contributor weight of the user based on the downstream content.

7. The computer-readable storage medium of claim 6, wherein the calculating metrics further comprises calculating metrics measuring a contributor weight of the user based on the downstream content containing a particular keyword.

8. The computer-readable storage medium of claim 6, wherein the calculating metrics further comprises calculating metrics measuring a contributor weight of the user based on contributor weights of users posting in the downstream content.

9. The computer-readable storage medium of claim 6, wherein the calculating metrics further comprises calculating metrics measuring a contributor weight of the user based on an average number of replies to the content posted by the user on the one or more social media platforms.

10. The computer-readable storage medium of claim 6, wherein the calculating metrics further comprises calculating metrics measuring a contributor weight of the user based on a number of users replying to, forwarding, or reposting the content posted by the user on the one or more social media platforms.

11. The computer-readable storage medium of claim 6, wherein the calculating metrics further comprises calculating metrics measuring contributor weights of other users related to the user by affinity connections.

12. A system, comprising:
a processor; and
a memory having instructions stored thereon that, if executed by the processor, cause the processor to:
determine identifying information associated with a user;
identify content posted by the user on one or more social media platforms by searching the one or more social media platforms for content:
posted by the user with a profile including at least a portion of the identifying information;
connected to downstream content in which a keyword appears; and
not containing the keyword;
identify downstream content associated with the content posted by the user; and
calculate metrics measuring a contributor weight of the user based on the downstream content associated with the content posted by the user.

13. The system of claim 12, wherein the instructions executable by the processor to calculate the metrics further comprise instructions that, if executed by the processor, cause the processor to identify keywords with respect to which the user has weight stronger than one or more other users.

14. The system of claim 12, wherein the memory further comprises instructions that, if executed by the processor, cause the processor to rank the user among a group of users based on a contributor weight with respect to one or more keywords.

15. The system of claim 12, wherein the memory further comprises instructions that, if executed by the processor, cause the processor to target advertising content to the user based on a contributor weight with respect to a set of keywords.

16. The system of claim 12, wherein the memory further comprises instructions that, if executed by the processor, cause the processor to monitor content posted by the user.

17. The system of claim 12, wherein the memory further comprises instructions that, if executed by the processor, cause the processor to target advertising content to the user based on a contributor weight with respect to a set of keywords and sentiment expressed in the downstream content.

18. The computer-readable storage medium of claim 6, wherein the calculating metrics measuring a contributor weight of the user based on the downstream content further comprises calculating metrics measuring a contributor weight of the user based on the frequency with which the content posted by the user on the one or more social media platforms is forwarded.

\* \* \* \* \*